(12) United States Patent
Wise

(10) Patent No.: US 7,692,402 B2
(45) Date of Patent: Apr. 6, 2010

(54) EMERGENCY APPLIANCE SYSTEM

(75) Inventor: Robert W. Wise, 365 Ely Rd., Petaluma, CA (US) 94954

(73) Assignee: Robert W. Wise, Petaluma, CA (US)

( * ) Notice: Subject to any disclaimer, the term of this patent is extended or adjusted under 35 U.S.C. 154(b) by 364 days.

(21) Appl. No.: 11/614,824

(22) Filed: Dec. 21, 2006

(65) Prior Publication Data

US 2008/0150473 A1    Jun. 26, 2008

(51) Int. Cl.
*H02J 7/00* (2006.01)
*H01R 3/00* (2006.01)
(52) U.S. Cl. .................................. 320/105; 439/500
(58) Field of Classification Search ............... 320/103, 320/104, 105, 110, 111, 112, 114; 307/9.1, 307/10.1, 66, 150; 290/1 A, 1 R, 2, 50; 429/170; 439/500

See application file for complete search history.

(56) References Cited

U.S. PATENT DOCUMENTS

| | | | | |
|---|---|---|---|---|
| 4,161,682 A | * | 7/1979 | Corvette | 320/105 |
| 4,180,746 A | * | 12/1979 | Giuffra | 307/127 |
| 4,667,141 A | * | 5/1987 | Steele | 320/105 |
| 5,418,701 A | * | 5/1995 | Hart | 362/376 |
| 6,636,015 B1 | * | 10/2003 | Levine et al. | 320/105 |
| 6,799,993 B2 | * | 10/2004 | Krieger et al. | 439/500 |

OTHER PUBLICATIONS

Revolution Power; RoadPro RPSC-895 Emergency Jumpstart System; http://www.revolutionpower.com/servlet/the-9/Roadpro-RPSC-dsh-895-Emergency-Jumpstart/Detail; Retrieved from the Internet Nov. 2, 2006.
Coleman Powermate CPMPMJ7274 All Weather Jumpstart System with Compressor and 400 Watt Power Inventer; http://www.toolfetch.com/Category/ Automotive/Battery_Tools/CPMPMJ7274.htm; Retrieved from the Internet Nov. 2, 2006.

* cited by examiner

*Primary Examiner*—Edward Tso
*Assistant Examiner*—M'Baye Diao
(74) *Attorney, Agent, or Firm*—Michael A. Glenn; Glenn Patent Group

(57) ABSTRACT

A portable emergency appliance comprises a housing and an integrated power source. A retractable handle extends from the housing between a first position and a second position. Retractable cables are connected to the power source and are removably connectable to the retractable handle, such that the cables are secured by the handle when the handle is in the first position, and are at least partially extended when the handle is in the second position. The cables are then releasable from the handle at the second position, to typically provide further extension and retraction to render service to an external entity. The power source is preferably rechargeable. The emergency appliance may preferably provide a variety of other functions, such as but not limited to AC power, DC power, pressurized air, lighting, tool storage and/or data storage and/or display.

28 Claims, 20 Drawing Sheets

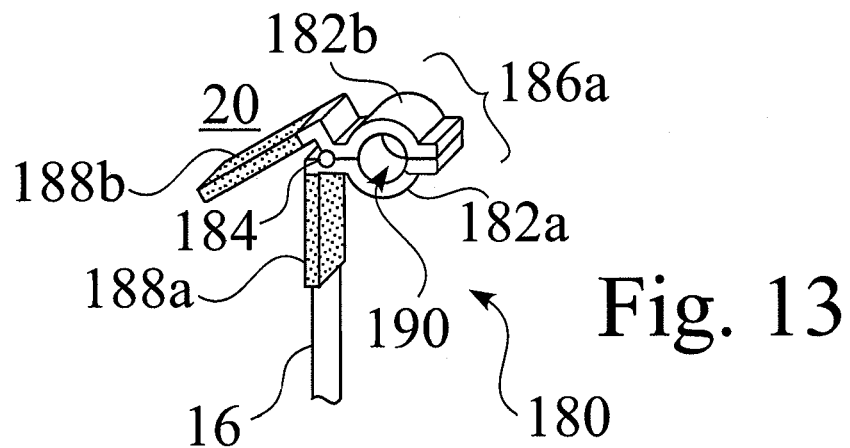
Fig. 13
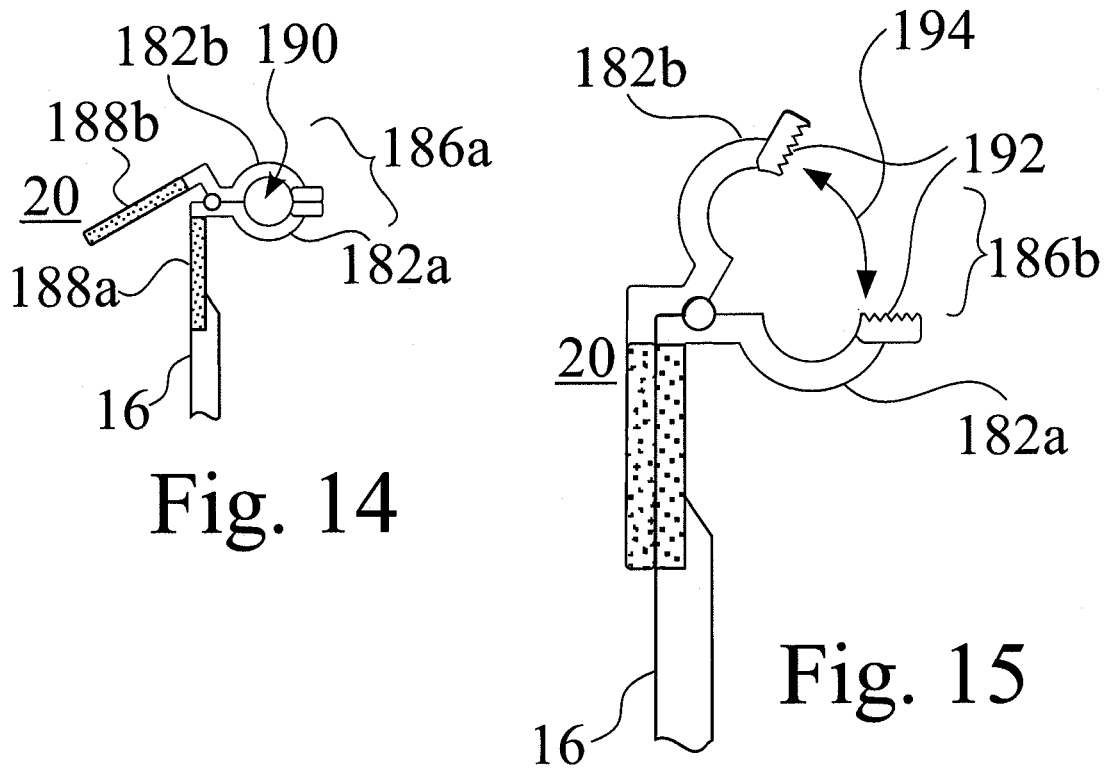
Fig. 14
Fig. 15
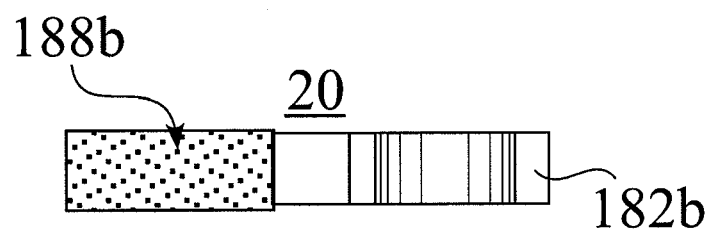
Fig. 16

EMERGENCY APPLIANCE SYSTEM

FIELD OF THE INVENTION

The invention relates to the field of portable assistance devices. More particularly, the invention relates to improved portable power assistance structures and processes.

BACKGROUND OF THE INVENTION

Vehicles are often disabled for a wide variety of reasons, such as but not limited to dead batteries, faulty charging systems, and/or flat tires, which at the very least often pose a great inconvenience to motorists and their passengers.

Such problems often occur while the vehicle is parked, such as at the person's residence, place of work, school, or while shopping. As well, cars are often disabled on the road, such as while they are being driven, posing an even greater risk, and exposing the driver and their passengers to the dangers of their immediate environment, such as but not limited to busy and dangerous traffic, bad weather, unsafe locations, and/or poor visibility.

While some people are members of roadside assistance organizations, e.g. AAA, Chevron Travel Club, or may otherwise be at least partially reimbursed by their insurance carriers, it is not always possible to send a request for assistance, and the time to wait for assistance can be significant.

Some motor vehicles are provided with a variety of assistance tools, such as standard or optional accessories from the manufacturer, or dealer installed optional items. As well, motorists often acquire a variety of items to store in their vehicle, such as emergency flares, a flashlight, and/or an assortment of tools.

For example, motorists may either possess or be able to otherwise acquire a set of battery jumper cables to use if the need arises. However, such a user also needs a secondary power source to be able to render assistance to a disabled vehicle. While a secondary vehicle may be available, it is often not convenient to position the secondary vehicle close enough to the disabled vehicle to connect the cables. As well, loose battery jumper cables are often easily tangled and confused, and many users do not know how to safely jump between two vehicles or batteries. For example, for cables that are connected to a power source, crossed cables, or direct or indirect electrical contact between cables having different polarities can pose a significant danger to any of the disabled vehicle, the secondary vehicle, people in the immediate vicinity, and/or other objects, such as from a short circuit, and/or subsequent consequences, e.g. electrical shock, sparks, explosion or corrosion.

In addition, even if the user manages to properly configure a set of jumper cables to provide jumping, it is often difficult to return or rewind the cables after service is completed. Once a disabled vehicle is started, the driver and passengers are often in a hurry to continue on their travels, or to find a place for more comprehensive diagnosis and repair as needed.

For simple jumper cables that are not connected to a battery source, the jumper cables, if not securely stored, can at the very least come into contact with clothes, carpeting, upholstery, etc. As such cables commonly come into contact with batteries having wet cells containing acid, e.g. typically sulfuric acid, cables often retain residue that is extremely corrosive.

It would therefore be advantageous to provide a user friendly portable power assistance structure and method, to readily provide service where it is needed. The development of such a structure would constitute a major technological advance. As well, it would be further advantageous to provide a portable power assistance system that securely stores jumper cables out of the way when not in use. The development of such a system would constitute a further technological advance.

Some basic jumpstart systems having a rechargeable batteries are currently available, such as a RoadPro® Emergency JumpStart System Model No. RPSC-895, by Revolution Power, of Seattle Wash., which is listed as having 24 inch battery cables that are manually wrappable around exterior grooves on opposing sides of a handheld case.

Jump start systems are also available through The Coleman Company Inc., a subsidiary of Jarden Corporation, of Rye, N.Y. For example, a Coleman Powermate Model No. CPMPMJ7274 is listed as an All Weather Jumpstart System with Compressor and 400 watt Power Inverter. In such a system, small lengths of battery jumper cables are manually storable within a case having a carrying handle.

While such systems provide portable jump start structures, the user is required to manually unwind the battery cables when needed, and manually wind the cables when done. As Well, while such structures may include a carrying handle, the user is required to manually carry such a unit. For a unit that having a large capacity power source, the weight of an integrated battery may be significant.

It would be advantageous to provide a portable assistance structure and method, to provide simplified dispensing and storage of battery cables as needed. As well, it would be advantageous to provide a portable assistance structure that is easily positioned and maneuvered. The development of such a structure would constitute a major technological advance.

SUMMARY OF THE INVENTION

A portable emergency appliance comprises a housing and an integrated power source. A retractable handle extends from the housing between a first position and a second position. Retractable cables are connected to the power source and are removably connectable to the retractable handle, such that the cables are secured by the handle when the handle is in the first position, and are at least partially extended when the handle is in the second position. The cables are then releasable from the handle at the second position, and typically provide further extension and retraction to render service to an external entity, such as for a disabled vehicle. The power source is preferably rechargeable. The emergency appliance may preferably provide a variety of other functions, such as but not limited to AC power, DC power, pressurized air, lighting, tool storage and/or data storage and/or display. The emergency appliance may also preferably comprise wheels, by which a user can rollably move the appliance as desired, such as with the handle.

BRIEF DESCRIPTION OF THE DRAWINGS

FIG. 13 is a perspective view of an enhanced starter cable clamp for a portable emergency appliance;

FIG. 14 is a side view of an enhanced starter cable clamp in a closed position;

FIG. 15 is a side view of an enhanced starter cable clamp in an open position;

FIG. 16 is a top view of an enhanced starter cable clamp;

DETAILED DESCRIPTION OF PREFERRED EMBODIMENTS

Figure 1:
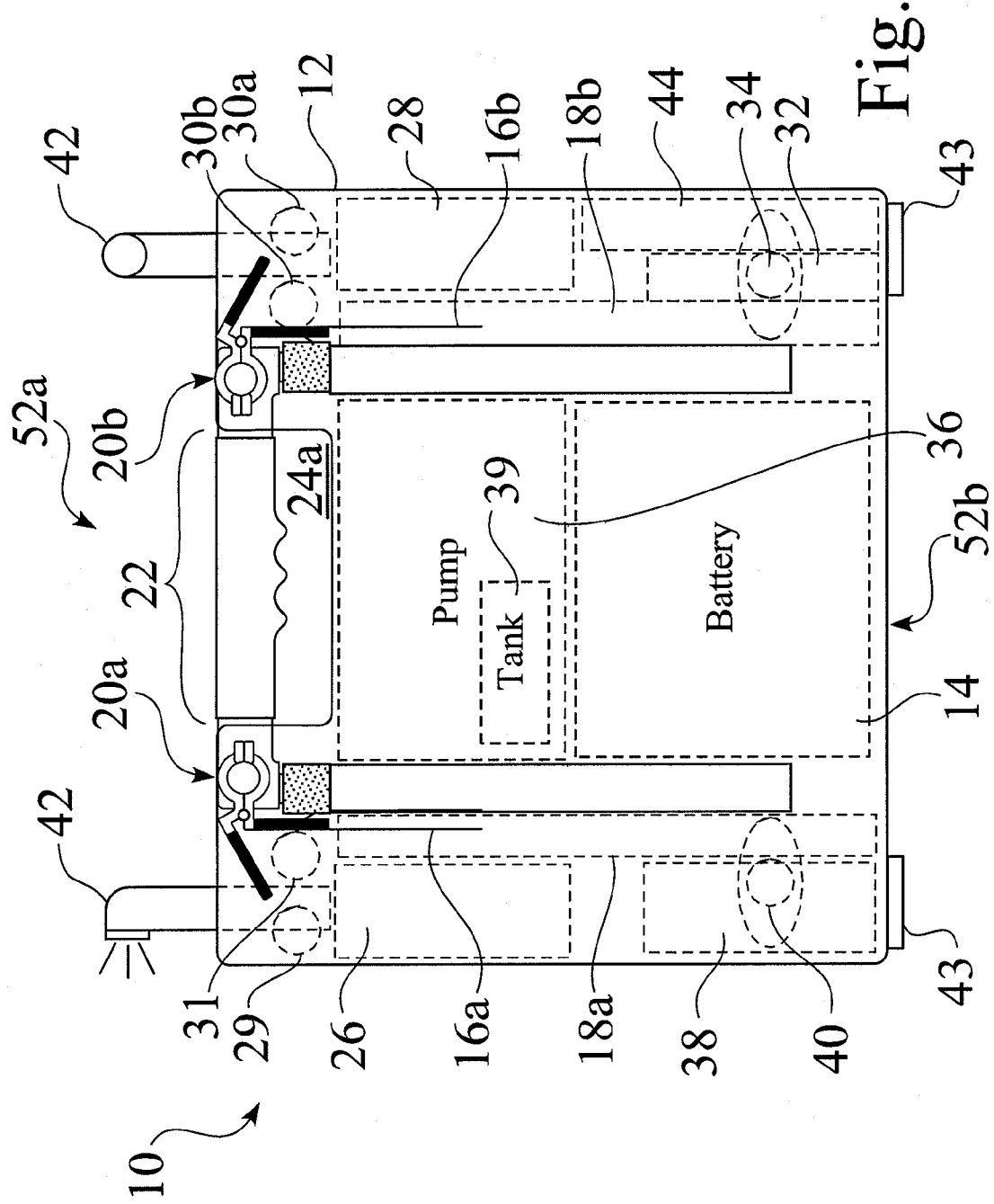
FIG. 1 is a functional view of a portable emergency appliance.
Figure 2:
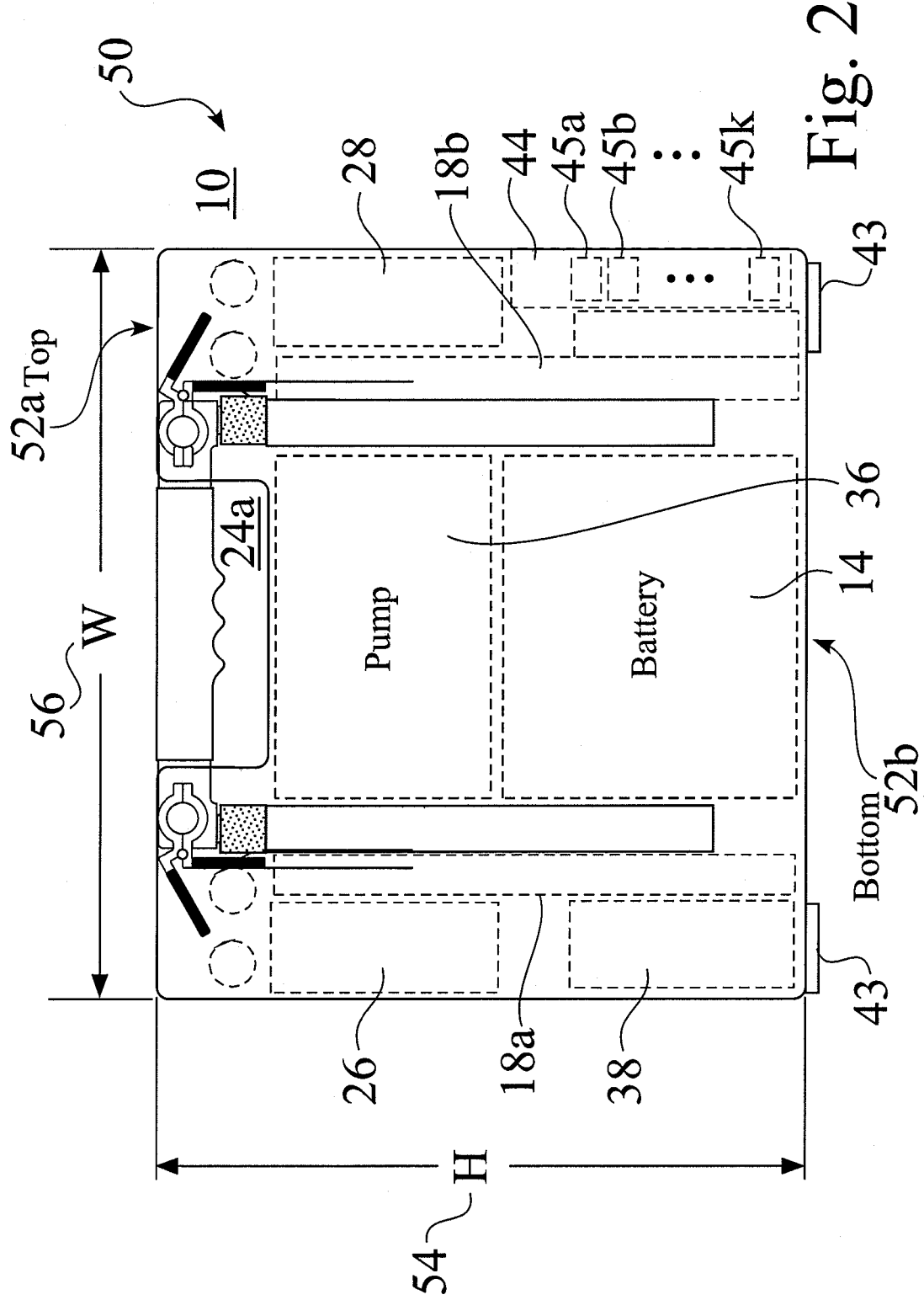
FIG. 2 is an alternate functional view of a portable emergency appliance.
Figure 3:
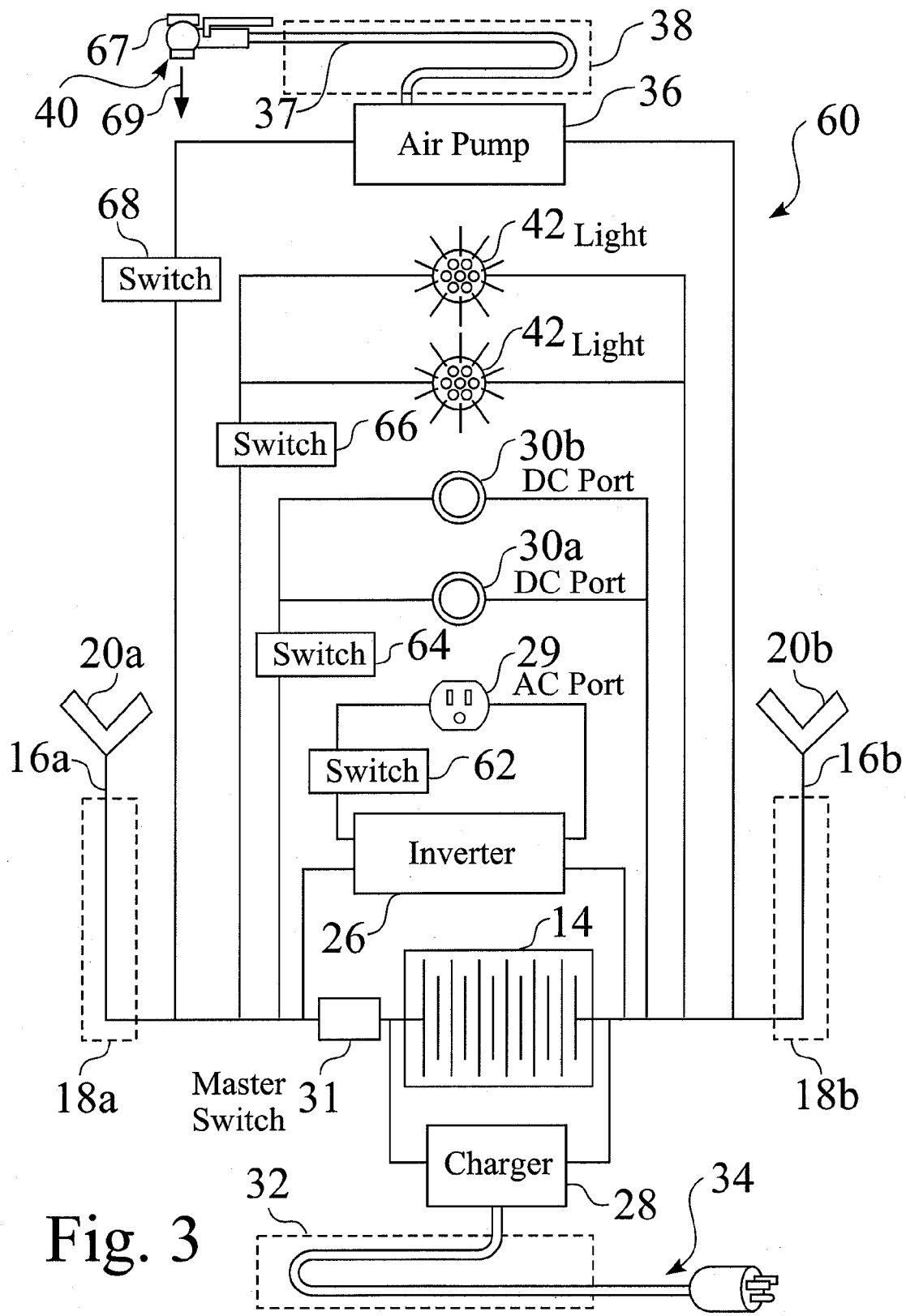
FIG. 3 is an exemplary schematic view of a portable emergency appliance.
Figure 6:
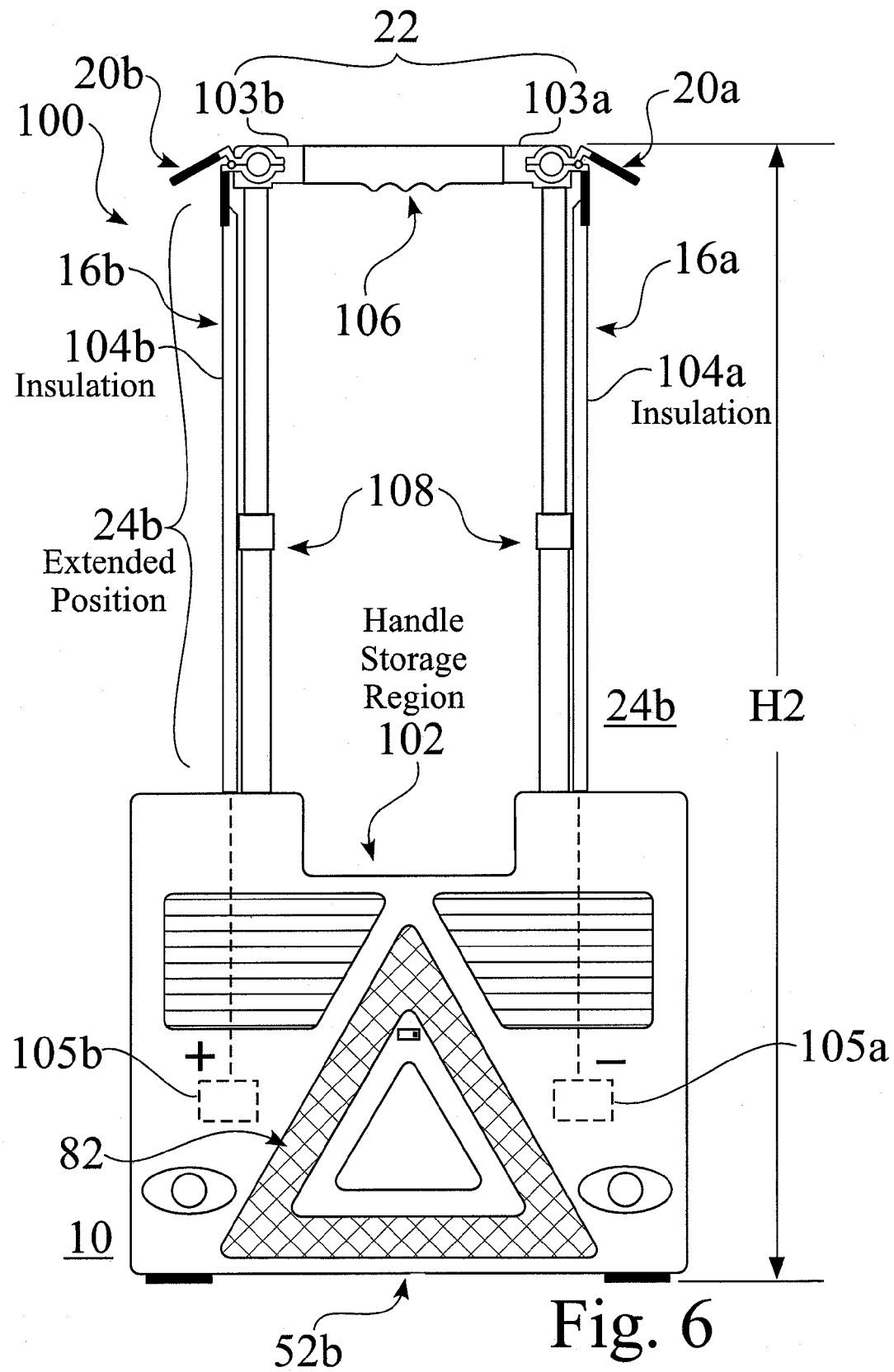
FIG. 6 is a rear view of a portable emergency appliance in a second extended position.

FIG. 1 is a functional view of a portable emergency appliance 10. FIG. 2 is an alternate functional view 50 of a portable emergency appliance 10. FIG. 3 is an exemplary electromechanical schematic view 60 of a portable emergency appliance 10. The portable emergency appliance 10 comprises a housing 12 and an integrated power source 14. A retractable handle 22 extends from the top 52a of the housing 12 between a first position 24a and a second position 24b (FIG. 6). Retractable cables 16, e.g. 16a, 16b, are electrically connected to the power source 14, and are removably connectable to the retractable handle 22, such that the cables 16 are secured by the handle 22 when the handle 22 is in the first position 24a, and are at least partially extended when the handle 22 is in the second position 24b. The cables 16 are then releasable from the handle 22 at the second position 24b, and typically provide further extension 252 (FIG. 20) and retraction 260 (FIG. 21), such as through respective cable reel assemblies 18, e.g. 18a, 18b, to render service to an external entity 202, such as but not limited to a motor vehicle 202 (FIGS. 17-23).

In some preferred embodiments of the emergency appliance 10, the battery 14 provides as much as 1800 peak cranking amps at 12-15 VDC, which provides sufficient power to start a wide variety of vehicles 202.

The portable emergency appliance 10, such as shown in FIGS. 1 and 2, may further comprise an on/off switch 31, which may preferably be recessed into the housing 12, such as to activate the appliance 10, and/or to allow electrical protection from the battery 14 when the appliance 10 is not used. The portable emergency appliance 10 may provide further electrical protection from improper connections, such as but not limited to a circuit breaker, a fuse, a light indicator, and/or an audio signal.

The power source 14 for the portable emergency appliance 10 is preferably rechargeable. For example, the exemplary emergency appliance 10 seen in FIG. 1 further comprises an integrated battery charger 28, e.g. 15 VDC at 400 mA, connected to the battery 14 and preferably having a retractable power cord 34, such as extending from a power cord reel 32, whereby the portable unit 10 may be connected to an external power source 302 (FIG. 24), e.g. 110 VAC, to recharge the onboard battery 14 as needed.

The emergency appliance 10 may preferably provide a variety of other functions, such as but not limited to AC power and/or DC power. As seen in FIG. 1, the emergency appliance 10 preferably comprises one or more DC ports 30, e.g. 30a, 30b, such as comprising standard automotive DC receptacles 30, that typically provide DC voltage from the battery 14. The emergency appliance 10 may also include one or more AC ports 29. The AC ports 29 are typically connected to the battery 14 through an inverter 26, such as to provide portable AC power, e.g. 110 VAC, or approximated, i.e. rectified AC power. In some embodiments 10, the AC ports 29 may provide true AC power, such as when the battery charger 28 is connected to external power 302 (FIG. 24) through the power cord 34.

The exemplary emergency appliance 10 seen in FIG. 1 and FIG. 2 further comprises an integrated air pump 36 having a retractable air hose 37 (FIG. 3) extending therefrom. The air hose 37 is preferably extendable and retractable from a hose reel 38. An air chuck 40 is located at the end of the air hose 37 opposite the air pump 36, and is preferably extendable from the housing 12, such as to fill up pneumatic tires or tubes. In alternate embodiments of the emergency appliance 10, the air hose 37 may similarly be linked to a retractable handle, e.g. handle 22, such as to provide easy access to the air chuck 40.

The air chuck 40 may typically include a standard Schrader-style connection, such as for filling motor vehicle tires 292 (FIG. 23) with pressurized air, e.g. up to 260 psi. The air chuck 40 may further comprise means for indicating pressure 67 (FIG. 3), such as but not limited to a gauge, an LED light, and/or an audio signal. In some embodiments 10, the air chuck 40 may comprise alternate connectors or adapter heads, such as for but not limited to Presta™ style valves, quick connectors, or needle valves, wherein the appliance 10 may be used for a wide variety of functions, such as filling tires, balls, air mattresses, and/or to provide an air supply for pneumatic, i.e. air tools.

As seen in FIG. 1, the air pump 36, i.e. compressor 36, may further comprise a pressure vessel 39 linked to the pump 36, such as to provide an adequate delivery rate of pressurized air 69 (FIG. 3) for a disabled vehicle 202.

The exemplary emergency appliance 10 seen in FIGS. 1 and 2 also preferably comprises integrated lights 42, such as to illuminate a work area for a user USR. The lights 42 are typically powered through the battery 14. The integrated lights 42 may be used to illuminate an engine compartment 232, storage area 222, e.g. trunk 222, or any other region surrounding a vehicle 202 or work area. In some embodiments, the lights 42 comprise halogen or LED lights 42. The lights 42 may also be configured to pop-up, i.e. extend, from the appliance housing 12, and/or may be rotatable, flexible or otherwise positionable, to controllably provide illumination as desired. In some embodiments, the appliance 10 comprises two pop-up LED floodlights 42, one on each side, that turn on when popped up, wherein each light 42 can rotate 360 degrees.

The exemplary emergency appliance 10 seen in FIG. 1 and FIG. 2 may also comprise a repair kit 44, such as comprising a compartment and tools 45, e.g. 45a-45k (FIG. 2), such as but not limited to tire repair tools, wrenches, pliers, sockets, ratchets, wire brushes and/or screwdrivers. Spare parts or supplies may also be provided within the repair module 44, such as but not limited to tire patches, patch cement, sandpaper, tire sealant, fuses, fuel filters, tape, hose clamps, Ty-Wraps™, light bulbs, and/or fasteners.

As seen in FIG. 1 and FIG. 2, the emergency appliance 10 also preferably comprises wheels 43 extending from the appliance housing 12, whereby a user USR can easily move or position the appliance 10 as desired, particularly when the handle 22 is extended to an open position 24b and pulled or pushed by the user USR to roll on the wheels 43.

The exemplary emergency appliance 10 seen in FIG. 1 and FIG. 2 is typically configured to be portable, such that the appliance 10 is easily stored and moved. For example, in some embodiments 10, the housing 12 has a closed height 54 of about 14.35 inches, a width 56 of approximately 16.50 inches, and an overall width 112 (FIG. 7) of about 6 inches.

While the exemplary emergency appliance 10 seen in FIG. 1 and FIG. 2 shows a single power switch 31, one or more components may be switchably enabled. For example, as seen in FIG. 3, a light switch 66 may preferably be used to activate one or more lights 42. As well, switches 62, 64 and/or 68 may be used to respectively provide power to the AC port 29, DC ports 30a, 30b, and/or the air pump 36.

Figure 4:
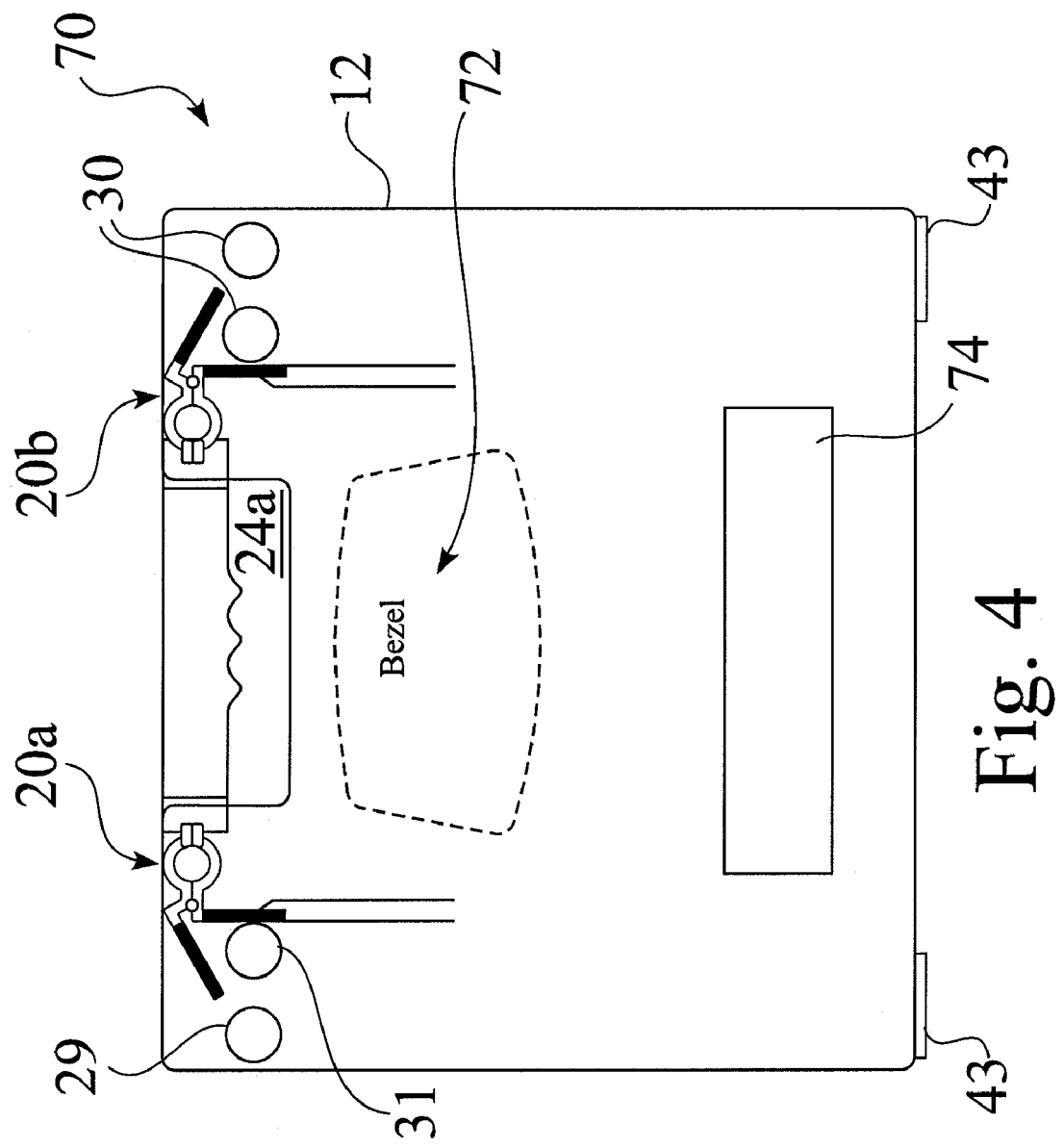
FIG. 4 is a front exterior view of a portable emergency appliance.

FIG. 4 is a front exterior view 70 of a portable emergency appliance 10. As seen in FIG. 4, the portable emergency appliance 10 preferably includes one or more DC ports 30, e.g. 30a, 30b, and may further comprise one or more AC ports 29, as well as an on/off switch 31 to activate the cables 18a, 18b, AC port 29, DC port 30, and/or lights 42.

The front 110a (FIG. 7) of the housing 12 may preferably further comprise a bezel 72. In some embodiments, the bezel 72 includes intelligent storage and display of relevant information for the user USR. For example, in some embodiments 10, the bezel 72 comprises memory to store information for one or more vehicles 202, e.g. up to four vehicles 202. Such information may comprise front and rear tire pressure settings, relevant manufacturer's specifications and/or contact information, e.g. a help desk. Some embodiments of the bezel 72 comprise any of an automatic mode and/or a manual mode for the input and/or display of information, which may preferably be expressed in any of US and/or EU units. The bezel 72 may also preferably comprise an illuminated display for information. In some embodiments, the housing 12 further comprises means 74 for physically attaching information, e.g. a decal, such as within a recessed area 74 in the housing 12.

Figure 5:
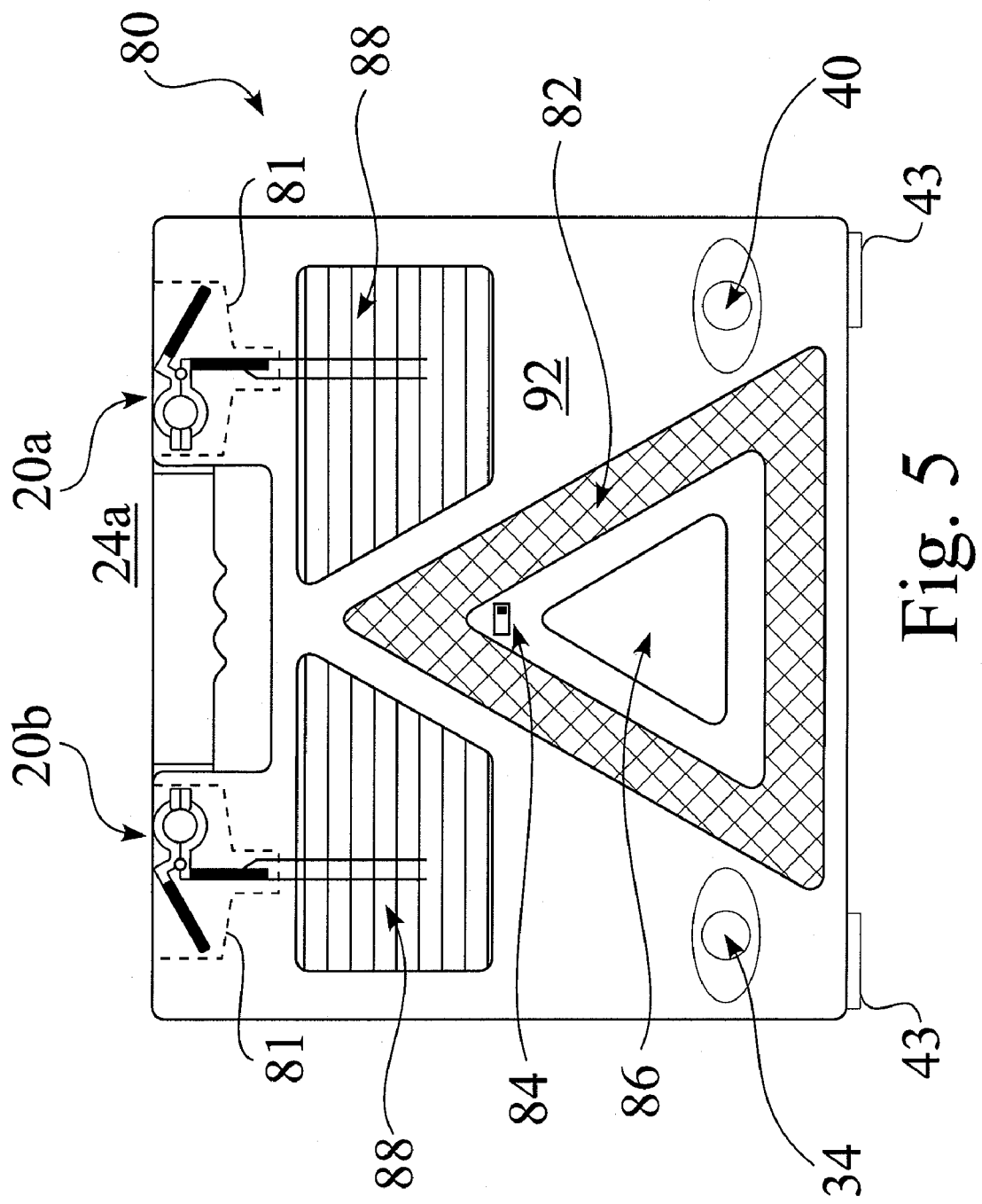
FIG. 5 is a rear view of a portable emergency appliance in a first collapsed position.
Figure 7:
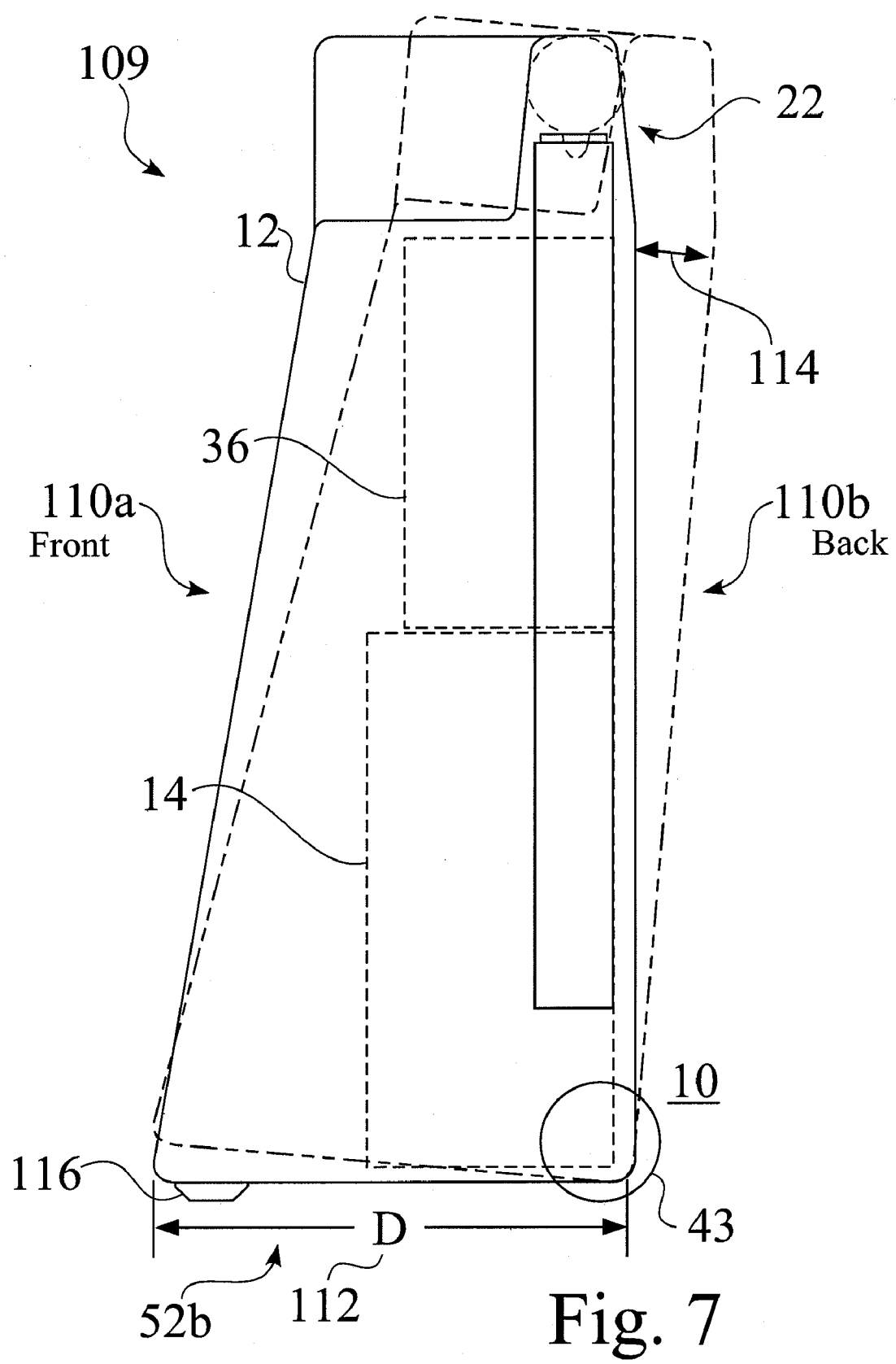
FIG. 7 is a left schematic side view of a portable emergency appliance having an extendable handle.
Figure 8:
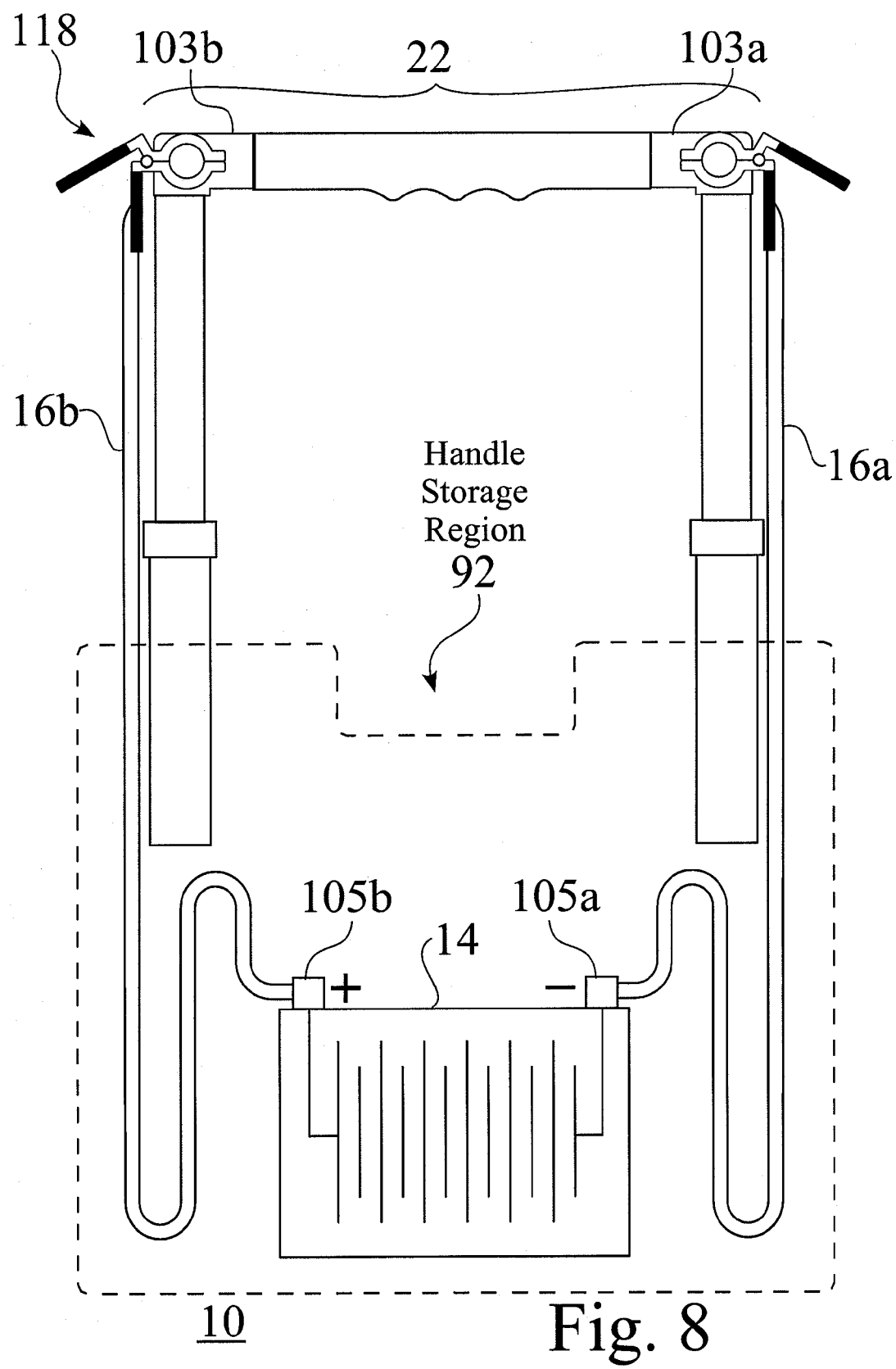
FIG. 8 shows retractable battery cables connected to a power source and attached to a member extending from a portable emergency appliance.

FIG. 5 is a rear view 80 of a portable emergency appliance 10 in a first collapsed position 24a. FIG. 6 is a detailed rear view 100 of a portable emergency appliance 10 in a second extended position 24b. FIG. 7 is a left partial schematic side view 109 of a portable emergency appliance 10 having an extendable handle 22, and an integrated battery 14 and air supply 36. FIG. 8 is a detailed schematic view 118 showing retractable battery cables 16a, 16b connected to a power source 14 and attached to a movable member, i.e. handle 22 extending from a portable emergency appliance 10.

The exemplary portable emergency appliance 10 seen in FIG. 5 may further comprise one or more air vents 88 defined through the housing 12, e.g. the back 110b (FIG. 7) of the housing 12, such as for cooling any of the pump 36 and the inverter 26. The appliance 10 shown in FIG. 5 and FIG. 6 also comprises safety illumination 82, which may provide a flashing mode, such as to alert passing motorists. The safety illumination 84 may also be controllable, such as between off, on and flashing modes, through a switch 84. The safety illumination 84 may preferably provide light in one or more colors, such as white, yellow, amber, red and/or blue light. While the exemplary safety illumination 84 seen in FIG. 5 and FIG. 6 defines a substantially triangular shape, such as to resemble a conventional cautionary device, e.g. a roadside caution sign, the safety illumination 84 can alternately be configured in a wide variety of shapes, and may further comprise an animated or textual display, e.g. "SLOW" or "CAUTION".

When the portable emergency appliance 10 shown in FIG. 5 is in a first collapsed position 24a, wherein the handle 22 is retracted, the cables 16a, 16b are retracted within the housing 12, wherein the cable clamps 20a, 20b, respectively connected to the cables 16a, 16b, are substantially contracted, such as to fit into recessed pockets 81 in the housing, i.e. case 12.

As seen in FIG. 6, when the handle 22 is extended to an open position 24b away from a handle storage region 102, the cables 16a, 16b are at least partially extended from the housing 12, whereby the cable clamps 20a, 20b, respectively connected to the cables 16a, 16b, are substantially accessible.

In the exemplary appliance 10 shown in FIG. 6, the extended height of the appliance 10 is approximately 34 inches when the handle 22 is extended to a fully open position 24b, whereby a user USR can conveniently move the appliance 10, such as by rolling on the wheels 43. In the open position 24b, the user USR may also conveniently detach the cable clamps 20a, 20b from the handle 22.

Once detached, the cables 16a, 16b are then typically further extendable 252 (FIG. 20) from their respective cable reel assemblies 18a, 18b as needed, such as to provide a jump start 254 for a disabled vehicle 202. In some embodiments of the portable emergency appliance 10, the cables 16a, 16b are preferably sufficiently long enough to connect to a disabled vehicle 202 while the housing is located near the vehicle 202, e.g. on the ground. The gauge and material on the conductive cables 16 may preferably be chosen to limit resistive loss from the chosen length of cables 16.

After use, the cable clamps 20a, 20b may then be reattached to the handle 22, while the cables 16a, 16b partially retract back, i.e. to take up slack, into their respective cable reel assemblies 18a, 18b. In some embodiments 10, the switch 31 may also be switched off at this time, such as to prevent shorting across the battery 14 through the cable clamps 20a, 20b.

As the handle 22 is subsequently returned from the open position 24b to the closed position 24a, the cables 16a, 16b retract further, whereby the attached cable clamps 20a, 20b return to their stowed position, such as into the recessed pockets 81 in the housing 12, and wherein the cables 16a, 16b are stored out of the way, e.g. such as protected from direct contact with other objects or users USRs.

The exemplary retractable handle 22 seen in FIG. 6 comprises extendable and retractable members 108, such as respectively comprising telescoping members 108. The top of the handle 22 typically comprises a central region 106, by which a user USR may extend or retract the members 108 and position the emergency appliance 10, such as by tilting 114 (FIG. 7) onto the wheels 43 and rolling on the wheels 43 as desired. The exemplary retractable handle 22 seen in FIG. 7 also comprises means for leveling 116 the appliance 10 having wheels 43, such as stops 116 integrated into the housing 12, or one or more separate elements 116 fixedly attached to the housing 12.

The central region 106 of the handle 22 may comprise an electrically insulative barrier between opposing handle sides 103a and 103b, such as to prevent a short circuit across the battery 14 between cables 16a, 16b. In some embodiments 10, one or both of the opposing handle sides 103a and 103b are electrically insulative, to prevent such a short circuit.

In some embodiments of the emergency appliance 10, color coding may be utilized to facilitate identification of electrical polarity. For example, the exemplary emergency appliance 10 shown in FIG. 6 has a flexible cable 16b having outer insulation 104b and an associated cable clamp 20b, extending from a positive terminal 105b of the battery 14, and a flexible cable 16a having outer insulation 104a and an associated cable clamp 20a, extending from a negative terminal 105a (FIG. 8) of the battery 14. Color coding for this exemplary configuration may preferably comprise color coding of the outer cable insulation 104a, 104b, and substantially matching color coding of opposing handle side members 103,103b. For example, for cable 16b connected to the positive terminal 105b, the cable insulation 104b and associated handle side 103b may preferably be colored red, such as to correspond with current automotive electrical standards. Similarly, for the cable 16a connected to the negative terminal 105a, the cable insulation 104a and associated handle side 103a may preferably be colored black, such as to correspond with a conventional color to designate a negative ground vehicle 202. As well, the cable clamps 20a, 20b may be similarly colored to designate polarity.

While color coding may be utilized to facilitate identification of electrical polarity for some embodiments of the emergency appliance 10, other designations may also be used, such as colored decals or stickers and/or molded details, such as in relation to the housing 12, the handle sides 103a,103b, and/or the cable clamps 20a, 20b. For example, such designations may comprise "POSITIVE" and "NEGATIVE", "POS" and "NEG", and/or "+" and "−".

Figure 9A:
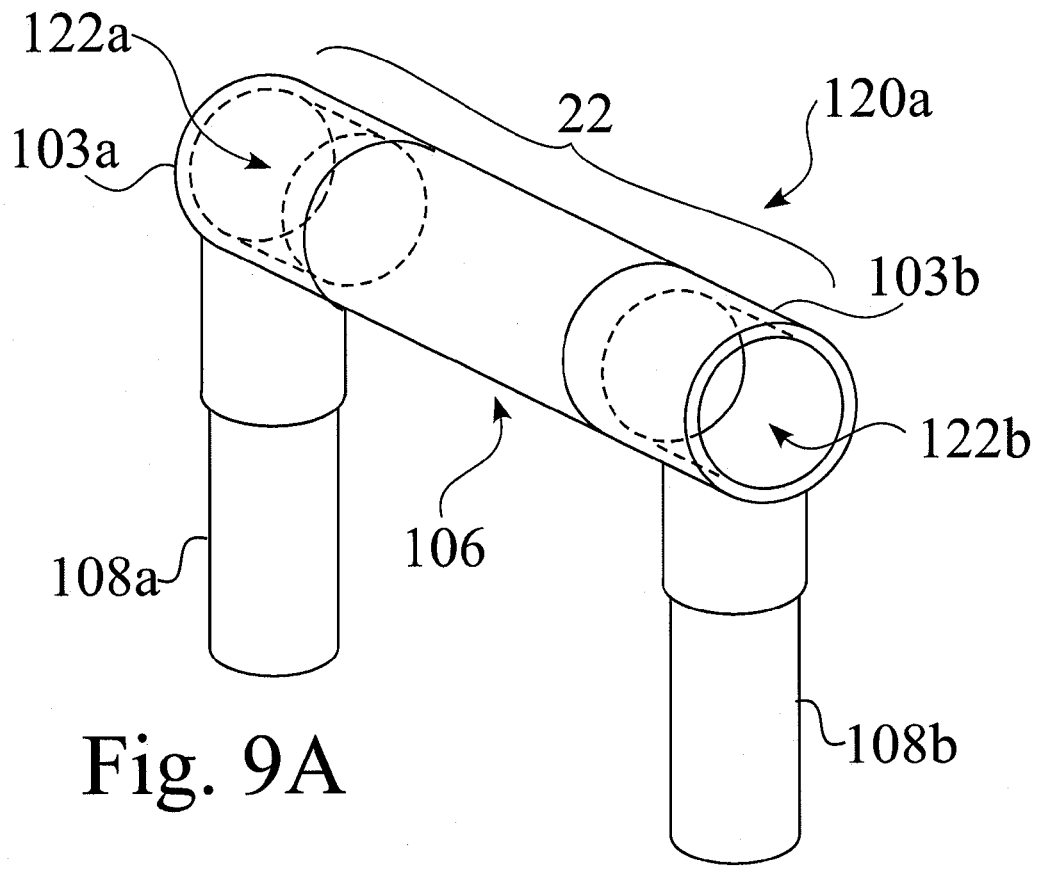
FIG. 9A is a partial perspective view of a handle region of an extendable member for an exemplary portable emergency appliance.
Figure 9B:
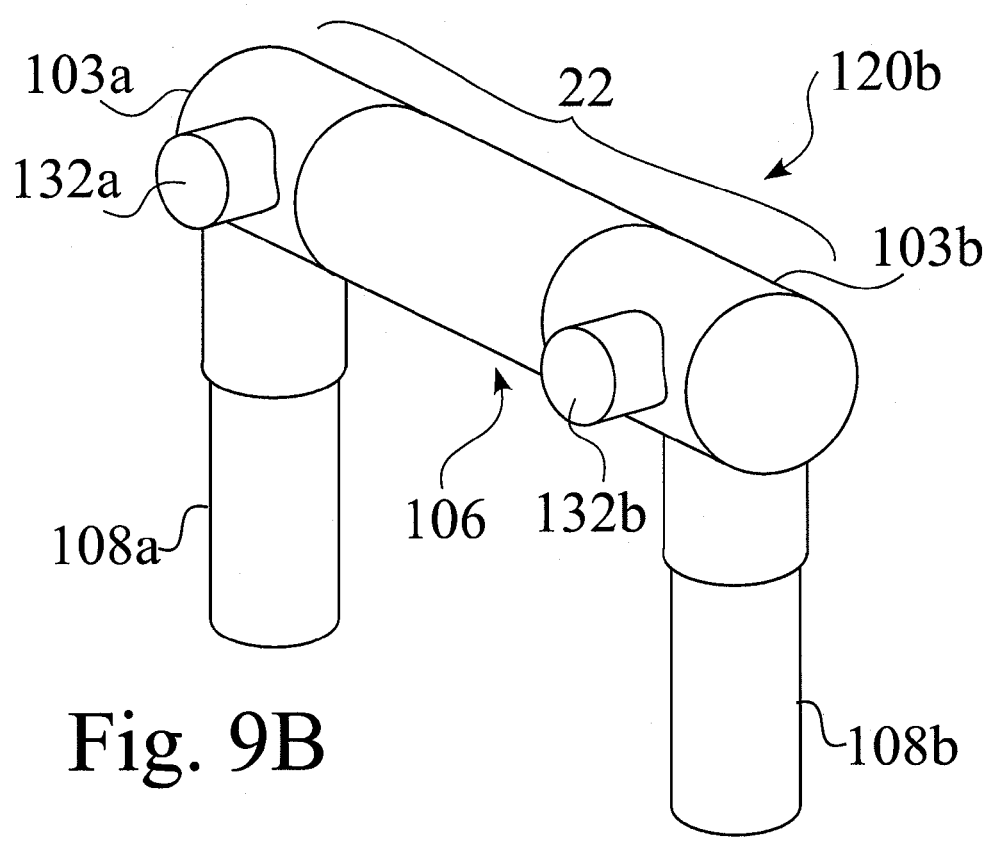
FIG. 9B is a partial perspective view of an alternate handle region of an extendable member for an exemplary portable emergency appliance.

FIG. 9A is a partial perspective view of an upper region 120a of an extendable member 22 for an exemplary portable emergency appliance 10. FIG. 9B is a partial perspective view of an alternate upper region 120b of an extendable member for an exemplary portable emergency appliance 10. Cable clamps 20, e.g. 20a, 20b, associated with the electrically conductive battery cables 16, e.g. 16a, 16b, are removably affixable to the handle 22 of the portable emergency appliance 10, such that they may be detached to provide service to a disabled vehicle 202.

In the exemplary handle 22 seen in FIG. 9A, opposing side members 103a,103b of the handle 22 include respective hollow regions 122a, 122b defined therein, wherein at least a portion of the clamps 20a, 20b can be inserted, i.e. stored when not in use, and wherein the cables 16a, 16b are movably extended or retracted as the handle 22 is moved in relation to the housing 12 of the portable emergency appliance 10.

In the alternate exemplary handle 22 seen in FIG. 9B, opposing side members 103a,103b of the handle 22 include respective posts 132a, 132b defined thereon, wherein at least a portion of the clamps 20a, 20b can be attached or clamped upon, i.e. stored when not in use, and wherein the cables 16a, 16b are movably extended or retracted as the handle 22 is moved in relation to the housing 12 of the portable emergency appliance 10.

Figure 10:
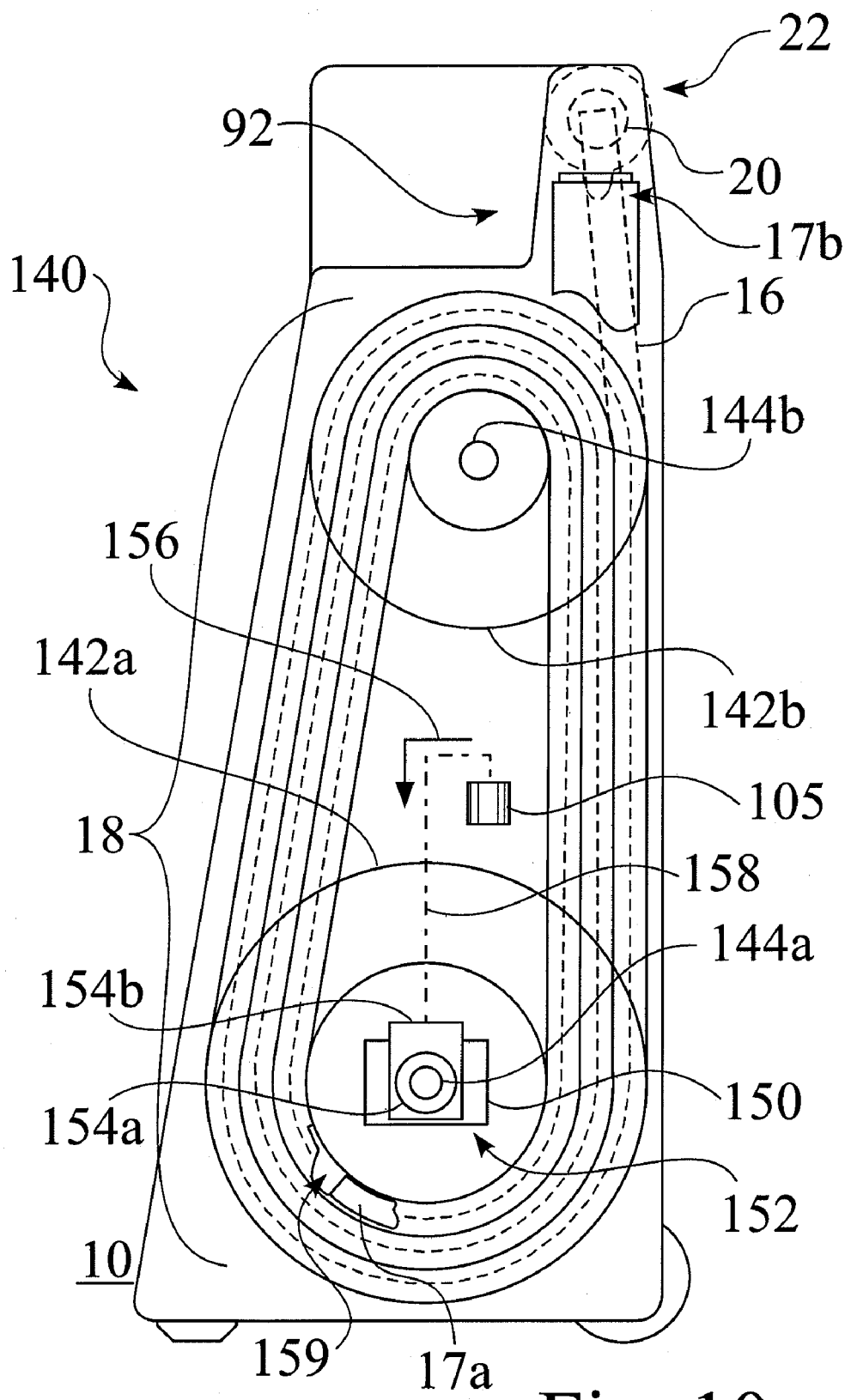
FIG. 10 is a schematic side view of cable reel storage for a portable emergency appliance, wherein a cable is removably affixed to an extendable appliance handle.
Figure 11:
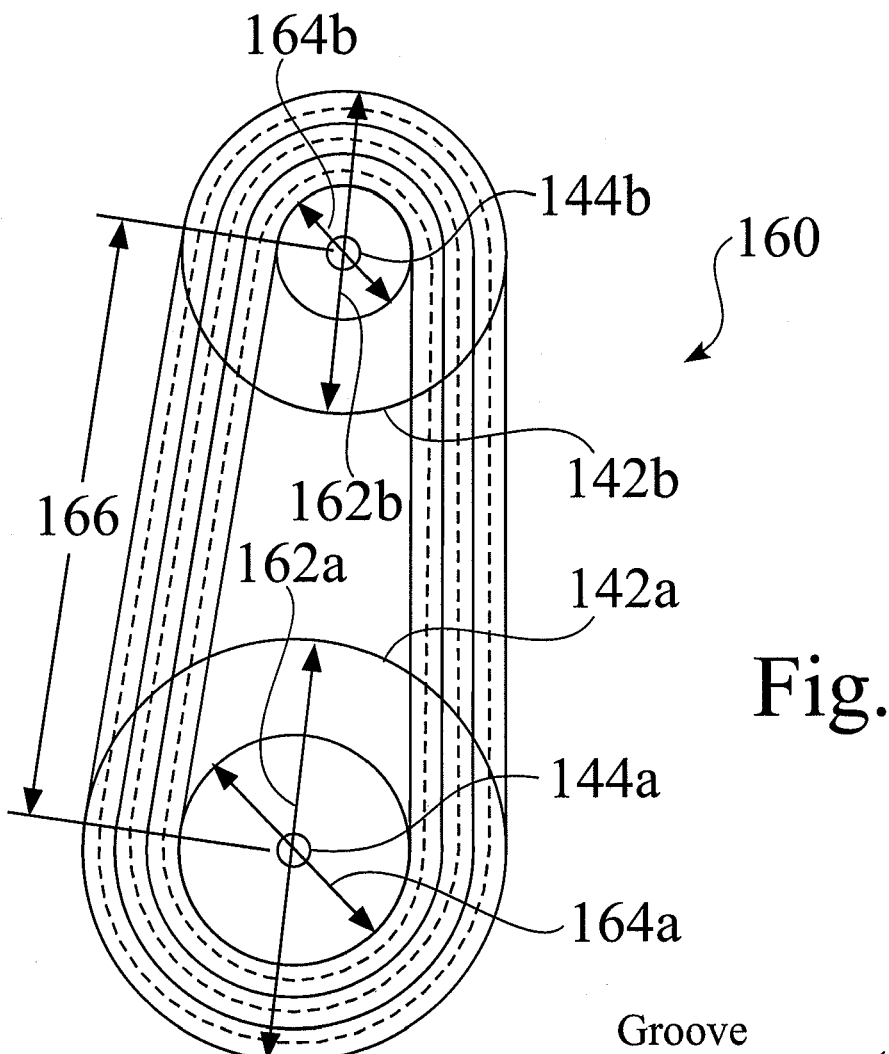
FIG. 11 is a detailed schematic side view of cable reel pulley storage for a portable emergency appliance.
Figure 12:
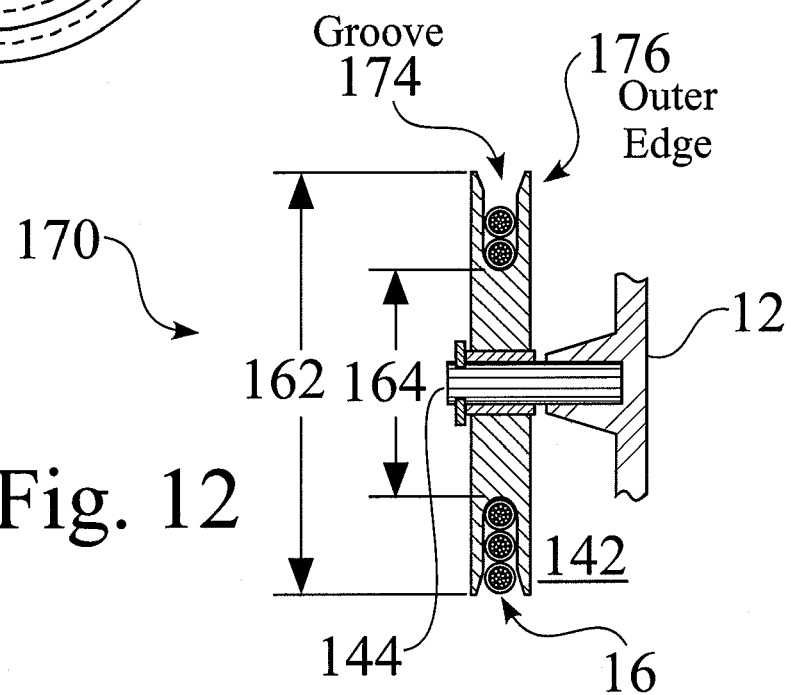
FIG. 12 is a detailed partial cutaway view of a cable pulley assembly.

Retraction Assembles for Emergency Appliance. FIG. 10 is a schematic side view 140 of cable reel storage for a portable emergency appliance 10, wherein a cable 16 is removably affixed to an extendable appliance handle 22. FIG. 11 is a detailed schematic side view 160 of cable reel pulley storage for a portable emergency appliance 10. FIG. 12 is a simplified cutaway view 170 of an exemplary cable pulley 142 retained on an axle 144 within a housing 12, such as for a cable reel assembly 18.

In the exemplary portable emergency appliance 10 seen in FIG. 10, a cable reel assembly 18, e.g. 18a, 18b, typically comprises one or more pulleys 142, such as a driven pulley 142a and a free spinning pulley 142b around which a cable 16 is rotationally wound. In the exemplary appliance shown in FIG. 10, a driven pulley 142a is mounted on an axle 144a, and typically includes means for retraction 150, such as a spring loaded tensioner 150. For a reel assembly 18 comprising a plurality of pulleys 142, a free pulley 142b is typically mounted to an axle 144b, and helps to securely store a length of electrically conductive cable 16, e.g. 6 feet of cable 16, such as between a fixed terminal 105 (FIG. 8) of the battery 14 and an extendable cable clamp 20.

In the exemplary embodiment seen in FIG. 10, power 156 to the cables 16 comes into the drive pulley 142a, such as through a stationary lead 158 and power connection means 152. The power 156, e.g. 12-15 volts dc, is typically supplied to the jumper cable 16 via a swivel 152, e.g. an electric swivel 152, having a first side 154a and a second side 154b, wherein the first side 154a turns with the pulley 142a, and wherein the second side 154b is affixed to the power source, i.e. battery 14, such as directly to a terminal 105, or indirectly through an electrical path, i.e. conduit or lead 158. The power 156 is typically transferred through the swivel 152 to the jumper cable 16, of which the first cable end 17a is affixed 159 to the drive pulley 142a.

As seen in FIG. 11, the driven pulley 142a has an associated outer diameter 162a and inner diameter 164a, and the free pulley 142b has an associated outer diameter 162b and inner diameter 164b, and the respective pulley axles 144a, 144b are mounted within the housing 12 at a distance 166 from each other.

For an exemplary cable reel assembly 18 having a driven pulley outer diameter 162a of about 5 inches and an inner diameter 164a of about 2.72 inches, a free pulley outer diameter 162b of about 3.8 inches and an inner diameter 164b of about 1.55 inches, and a pulley separation distance 166 of about 7.15 inches, the cable reel assembly 18 provides approximately 74 inches (over 6 feet) of cable storage.

As seen in FIG. 12, an exemplary pulley 142 is typically retained on an axle 144 which is affixed to or otherwise retained or integrated with the housing 12. The pulley 142 typically includes a groove 174 defined about the outer edge 176, for rotatably dispensing and receiving an associated battery cable 16. As seen in FIG. 10, the pulley 142, such as a drive pulley 142a, may further comprise cable attachment means 159.

While some embodiments of the air hose reel assembly 38 and the charging cord reel assembly 32 may comprise similar dual pulley construction, some embodiments of the air hose reel assembly 38 and the charging cord reel assembly 32 typically comprise a single pulley 142 that may preferably share the same axle 144 as the larger driven reels 142a for the cable reel assemblies 18. For example, the air pump module 36 shown in FIG. 1 typically comprises an auto retractable hose reel 38, which may preferably share a mounting axle 144 with the adjacent reel 18, e.g. 18a. Similarly, the battery charger module 28 shown in FIG. 1 typically comprises an auto retractable cord reel 32, which may preferably share a mounting axle 144 with an adjacent reel 18, e.g. 18b. The axles 144 are typically mounted to an inside wall of the housing 12, such as with a flush style fastener.

Cable Clamps for Emergency Appliance. FIG. 13 is a perspective view 180 of an enhanced starter cable clamp 20 for a portable emergency appliance 10, wherein the cable clamp 20 is in a first closed position 186a. FIG. 14 is a side view of an enhanced starter cable clamp 20 in a closed position 186a. FIG. 15 is a side view of an enhanced starter cable clamp 20 in an open position 186b. FIG. 16 is a top view of an enhanced starter cable clamp 20.

A first clamp member 182a is electrically connected to a second, i.e. free end 17b of an insulated electrically conductive cable 16, e.g. ⅜ inch diameter, which may preferably comprise a metal having high electrical conductivity, e.g. copper or copper alloy. The first clamp member 182a is hingeably affixed to a second clamp member 182b, such as through a pivot 184. The pivot 184 is typically biased, e.g. spring loaded, such that the clamp members 182a, 182b are normally in a closed position, and apply pressure to retain the clamps 20 when attached by a user USR. The clamp members 182a, 182b and the pivot 184 comprise an electrically conductive material and may preferably be plated, e.g. such as comprising zinc, cadmium or an alloy thereof, to resist corrosion.

A hollow region 190 may be defined between the clamp members 182a,182b, e.g. such as a cylindrical region having approximately 0.65 inch diameter opening 190. The clamp members 182a,182b may also typically comprise respective insulative handles 188a,188b, such as comprising a rubber, plastic or elastomer, that may be color coordinated, e.g. red or black, to any of their respective cables 16 and a portion 103 of the handle 22 to which they can be attached.

When the handle 22 of the portable emergency appliance 10 is in the stored position 24a, the cable clamps 20 are typically confined within recessed hollow regions, i.e. pockets 81 (FIG. 5), such as defined into the top of the housing 12. The cable clamps 20 are also attachable to the handle 20, such as contained within clamp pockets 122, e.g. 122a, 122b, defined into the handles 22 (FIG. 9A) or clamped to posts 132, e.g. 132a, 132b (FIG. 9B).

As seen in FIG. 15, one or both clamp members 182a, 182b may further include a serrated surface, i.e. teeth 192, such as to promote mechanical and electrical connection to a vehicle 202 or other entity. The clamp members 182a, 182b are hingably linked to each other, such as to be rotatably opened 194, e.g. 45 to 60 degrees. In one embodiment of cable clamps 20, the effective opening between members 182a, 182b is approximately 1.5 inches.

Exemplary Operation of Emergency Appliance. While the portable emergency appliance may be suitably adapted to provide a wide variety of functions in different environments, currently preferred embodiments 10 provide a range of roadside services.

Figure 17:
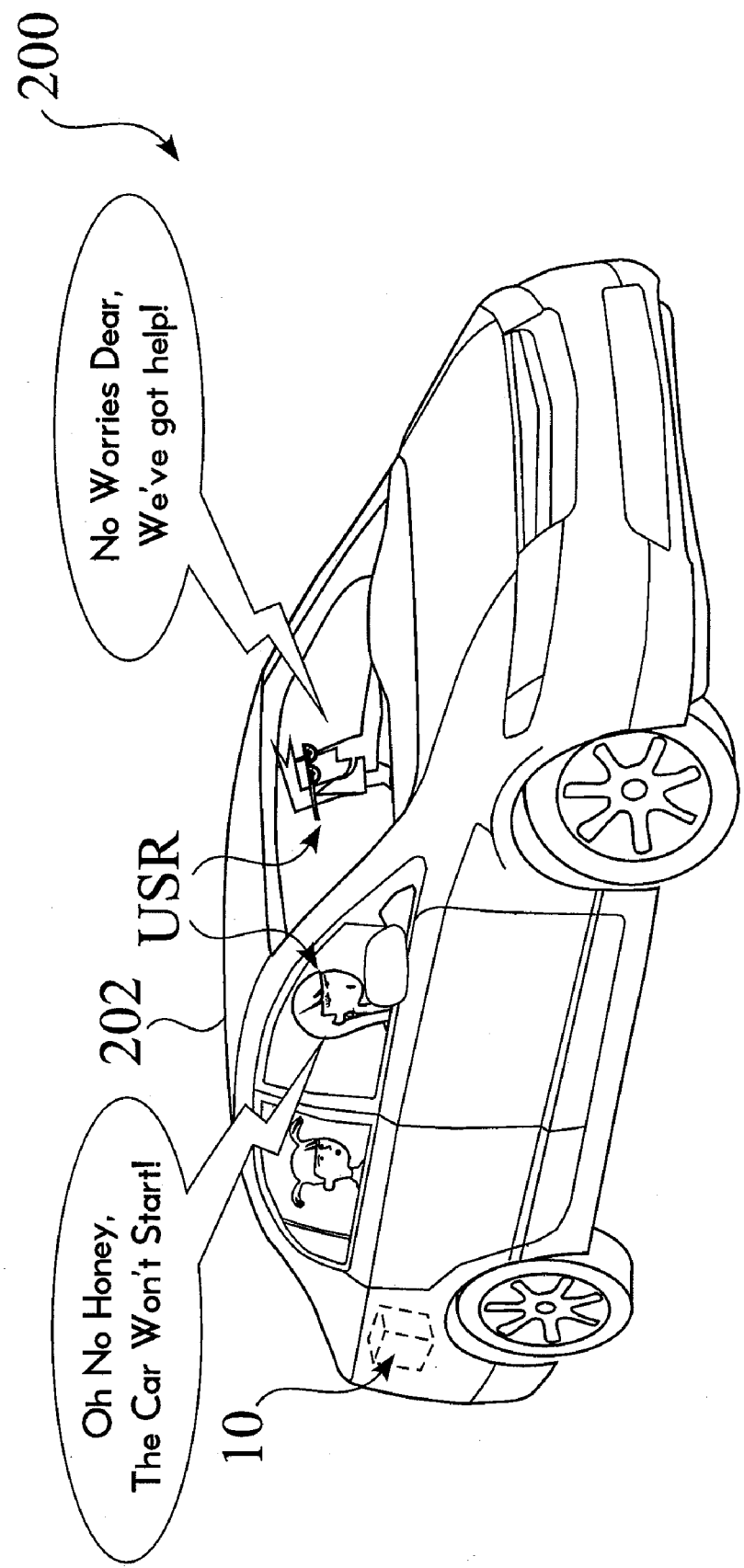
FIG. 17 shows a disabled vehicle having a stored portable emergency appliance.

As an illustrative example, FIG. 17 shows a disabled vehicle 202 having a stored portable emergency appliance 10. Dead batteries 234 (FIG. 19) are a common occurrence for vehicles 202, such as from electrical use when a vehicle 202 is parked, e.g. leaving lights or radio on, or from an old or faulty battery 234. As well, problems with a vehicle's charging system may excessively drain the charge of a battery 234, to the point that a vehicle may not be able to start. In addition, other problems, such as mechanical problems, fuel problems, cooling problems and/or electrical problems may make a vehicle hard to start, and excessively drain the charge of a battery 234.

Figure 18:
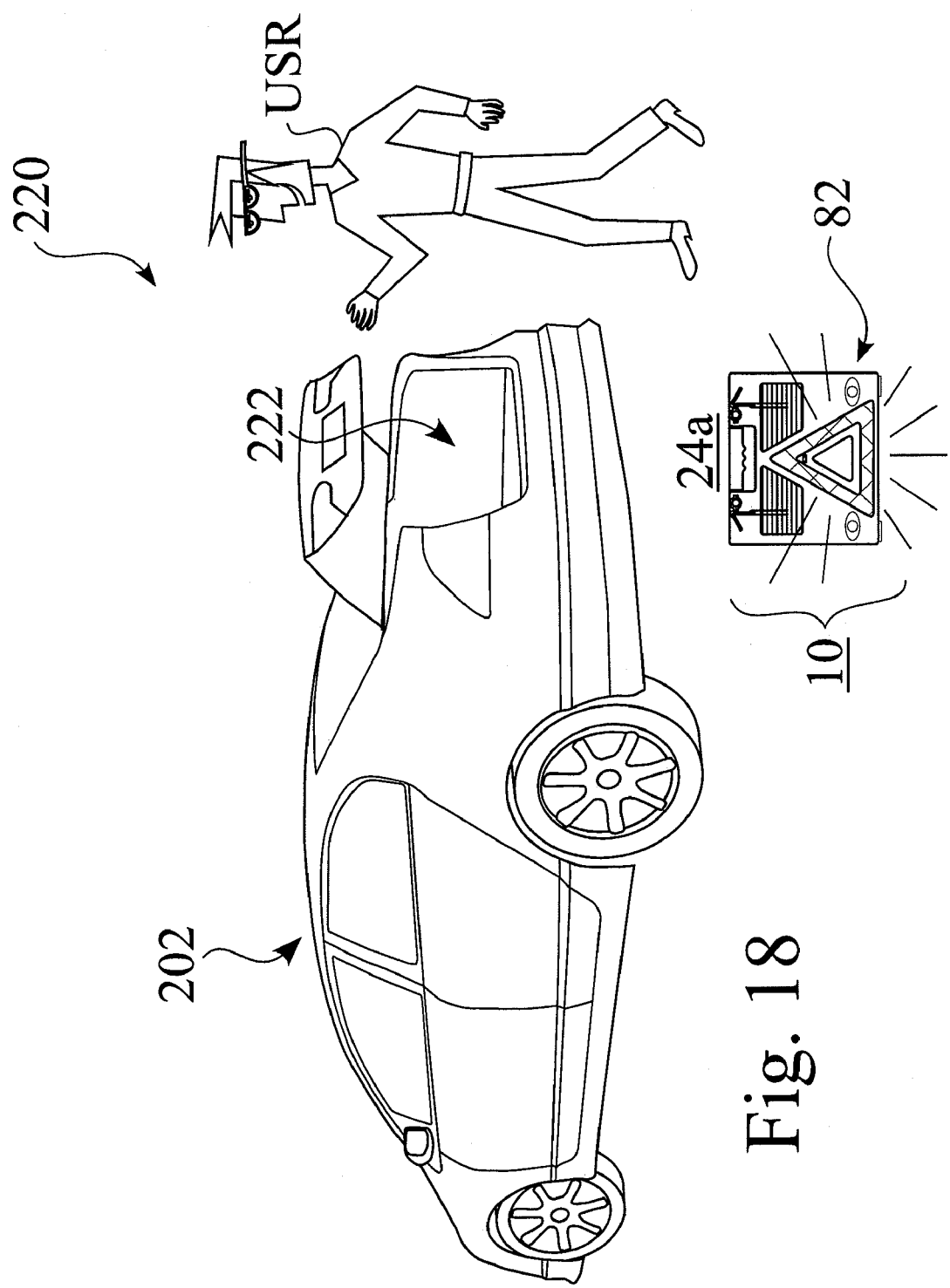
FIG. 18 shows the removal of a portable emergency appliance from storage, and activation of emergency illumination.
Figure 19:
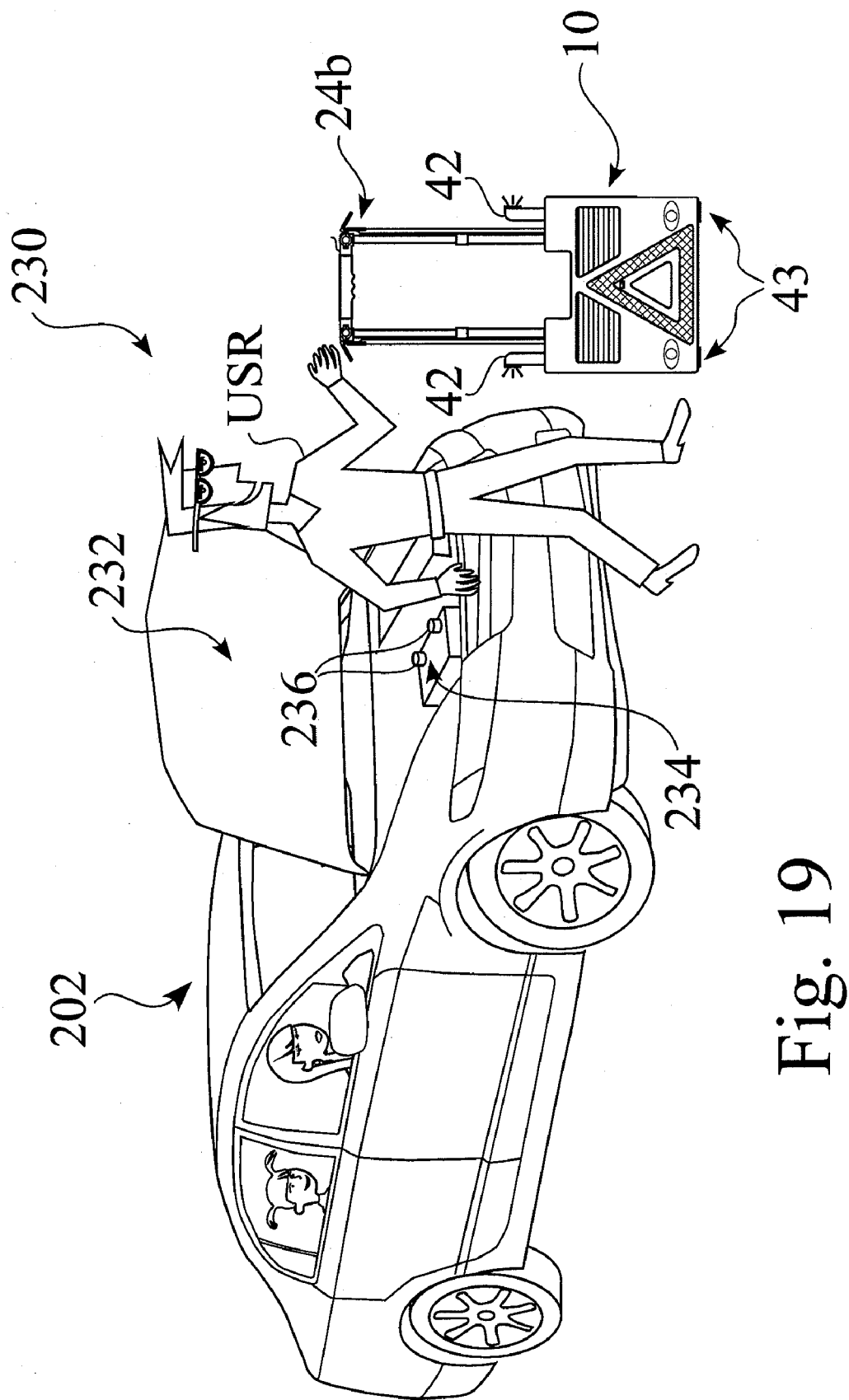
FIG. 19 shows the extension of the handle of portable emergency appliance, providing access to extendable jumper cables.

FIG. 18 shows the removal 220 of a portable emergency appliance 10 in a stowed position 24a from a storage area 222, such as from the trunk 222, and activation of emergency illumination 82. FIG. 19 shows 230 the extension of the handle 22 of a portable emergency appliance 10 to an extended position 24b, providing access to extendable jumper cables 16a, 16b. As seen in FIG. 19, the portable emergency appliance 10 may be moved using the handle 22 and wheels 43 into position relative to the vehicle 202, such as near the engine compartment 232 and/or vehicle battery 234 having terminals 236. As well, one or more lights 42 may be powered as desired, such as to illuminate the engine compartment 232 at night.

Figure 20:
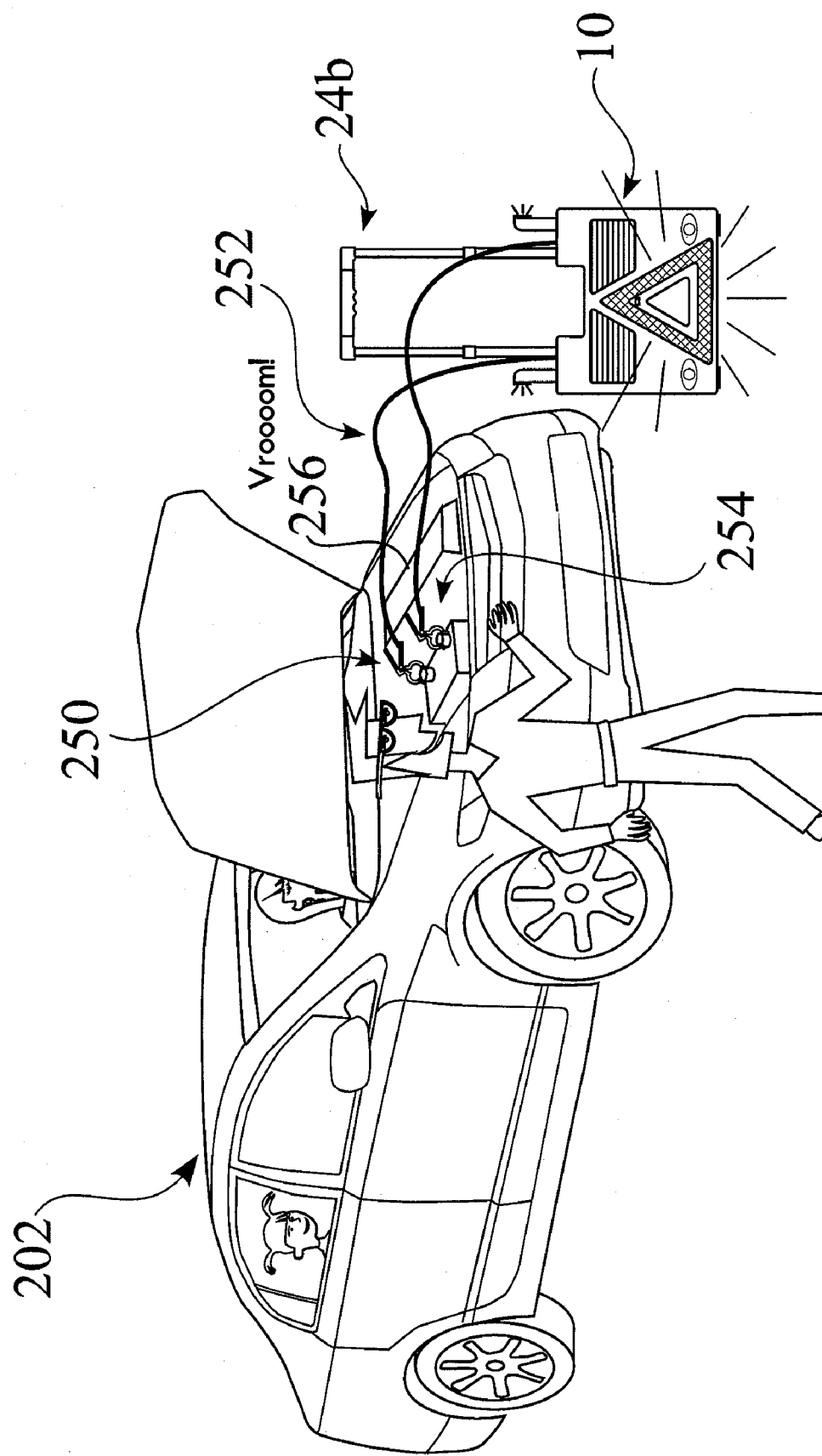
FIG. 20 shows the connection of extended jumper cables to a disabled vehicle, and subsequent starting of the engine.

FIG. 20 shows the further extension 252 and connection 250 of extended jumper cables 16a, 16b to a disabled vehicle 202, and subsequent starting of the engine 256. Since the exemplary portable emergency appliance 10 shown in FIG. 20 comprises opposing jumper cables 16a, 16b in separate reel assemblies 18a, 18b, the cables 18 can be individually pulled as needed. While FIG. 20 shows the exemplary connection of cable clamps 20a, 20b directly to the terminals 236 (FIG. 19) of a vehicle battery 234 (FIG. 19), the cable clamps 20a and/or 20b may be connected to other suitable elements or components of the vehicle 202, such as specified by the vehicle manufacturer. For example, a ground connection to a vehicle 202 often comprises connecting a cable clamp 20 to a portion of the frame or sheet metal of the vehicle 202, away from the vehicle battery 234. Similarly a positive connection to a vehicle 202 may preferably comprise connecting a positive cable clamp 20 to a positive polarity jumper terminal or to a positive post of a starter, start relay or starter solenoid.

Figure 21:
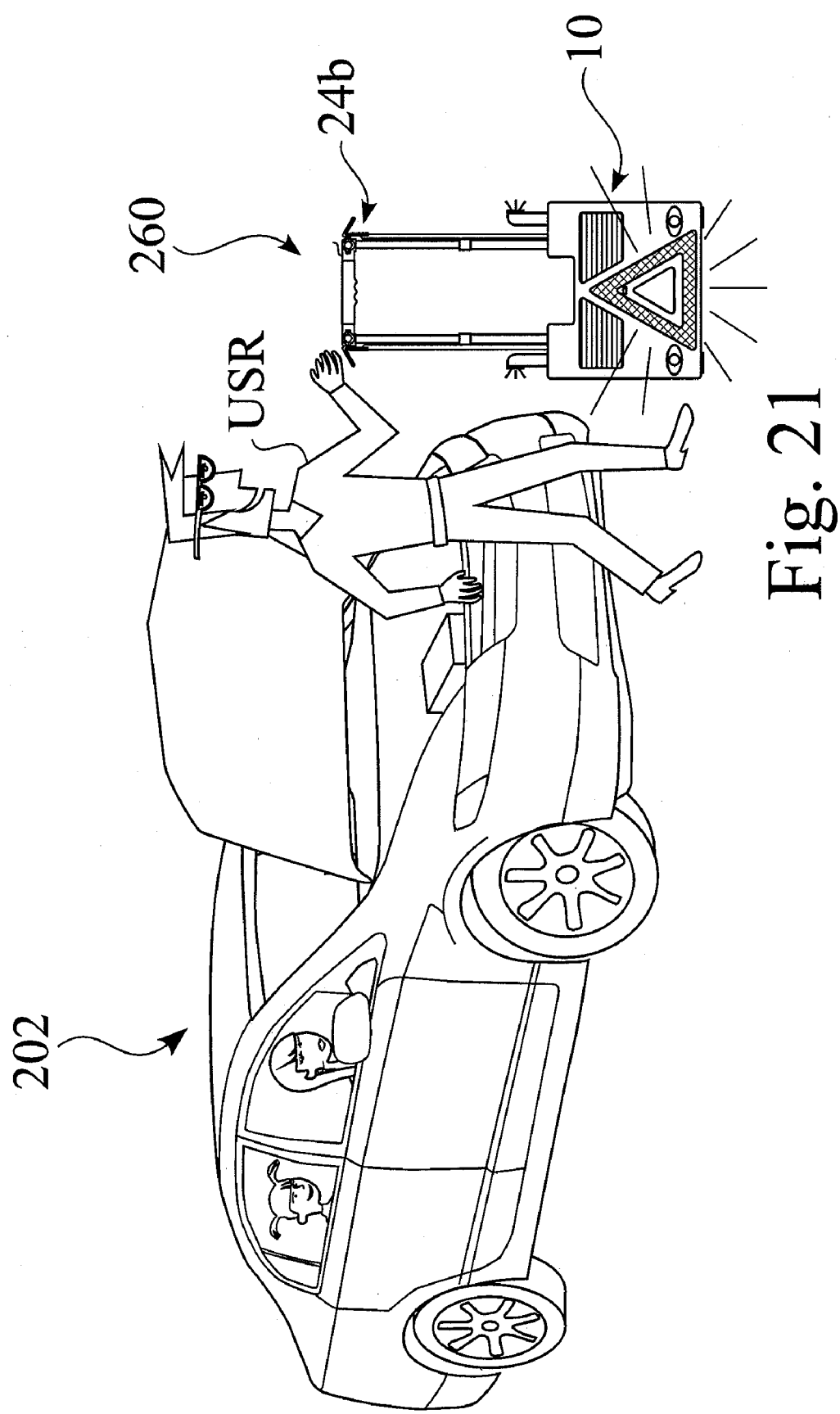
FIG. 21 shows the reconnection of the jumper cables to the extended handle of the portable emergency appliance.

FIG. 21 shows the reconnection 260 of the jumper cable clamps 20a, 20b to the extended handle 22 of the portable emergency appliance 10, and the partial retraction of the cables 16a, 16b into the reel assembles 18a, 18b within the housing 12. The tensioners 150 (FIG. 10) take up the excess length of the cables 16 within the reel assemblies 18a, 18b. The portable emergency appliance 10 may be moved, such as to be returned toward the trunk 222 of the vehicle 202, using the handle 22 and wheels 43, relative to the vehicle 202. As well, one or more lights 42 may still be powered as desired, such as to increase visibility for approaching traffic, and/or to illuminate the trunk 222 at night.

Figure 22:
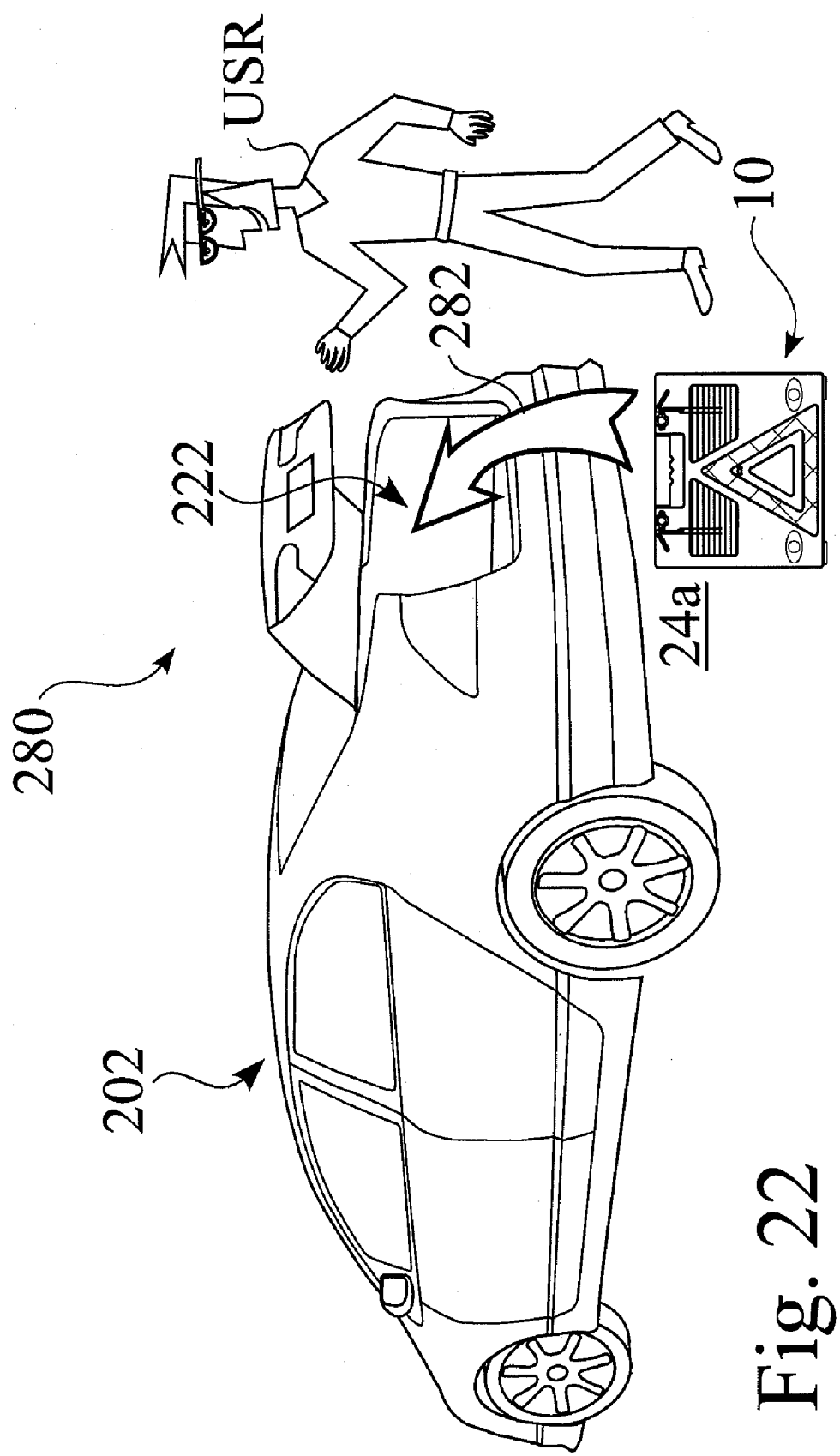
FIG. 22 shows the motorist returning the handle to the stored position, wherein the cables attached to the handle are also returned to a stored position.

FIG. 22 shows a schematic view 280 of the motorist USR returning the handle 22 to the stored position 24a, wherein the cables 16 attached to the handle 22 are also returned to a stored position. As seen in FIG. 22, the portable emergency appliance 10 may then be conveniently stored 282 within the vehicle 202, when the cables 16a, 16b and cable clamps 20a, 20b are retracted.

Figure 23:
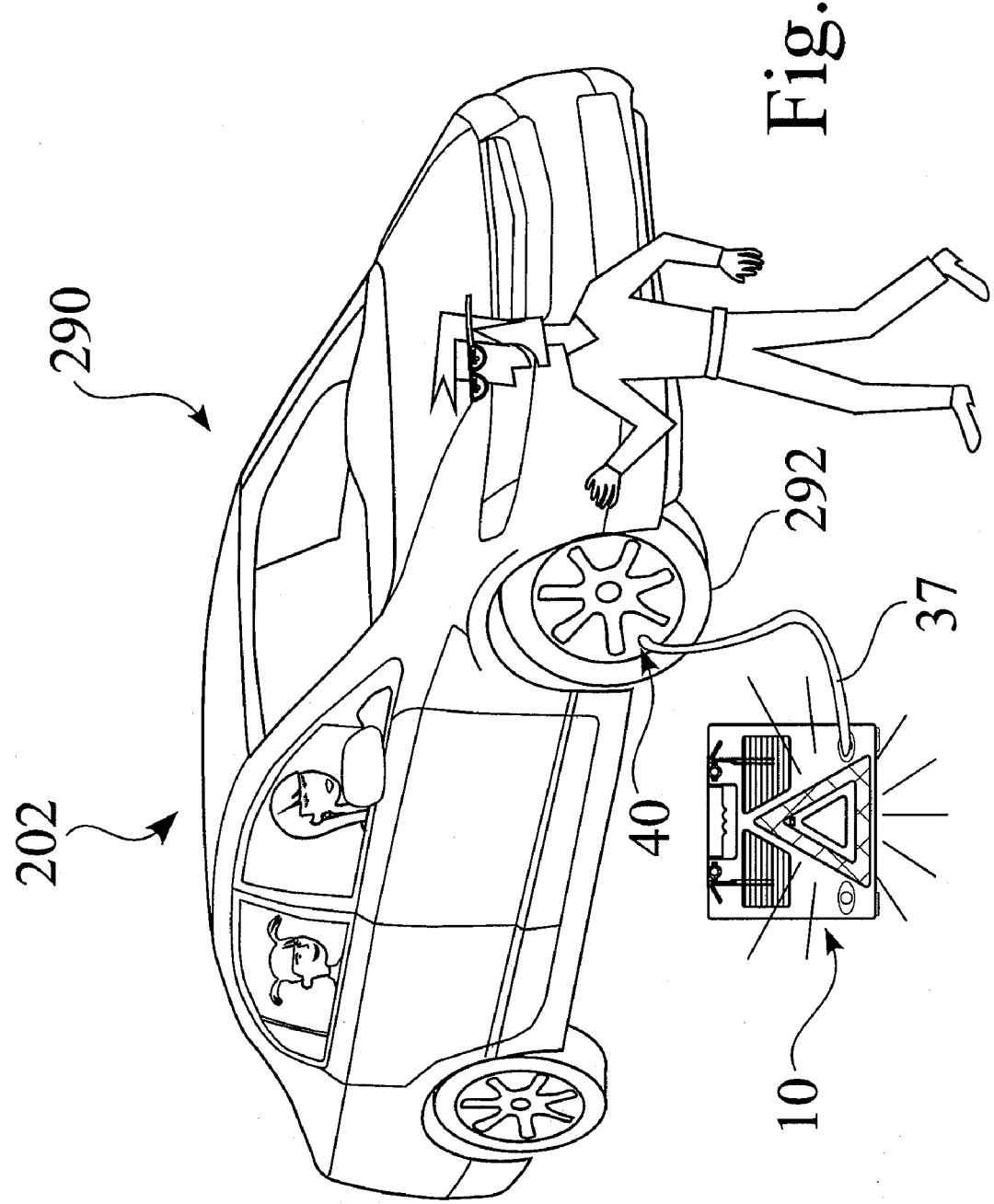
FIG. 23 shows the portable emergency appliance being used for other assistance functions.

FIG. 23 is a simplified schematic view 290 the portable emergency appliance being used for other assistance functions, such as for connecting an air hose 37 and air chuck 40 to a vehicle tire 292 for inflation using the integrated air pump 36.

Figure 24:
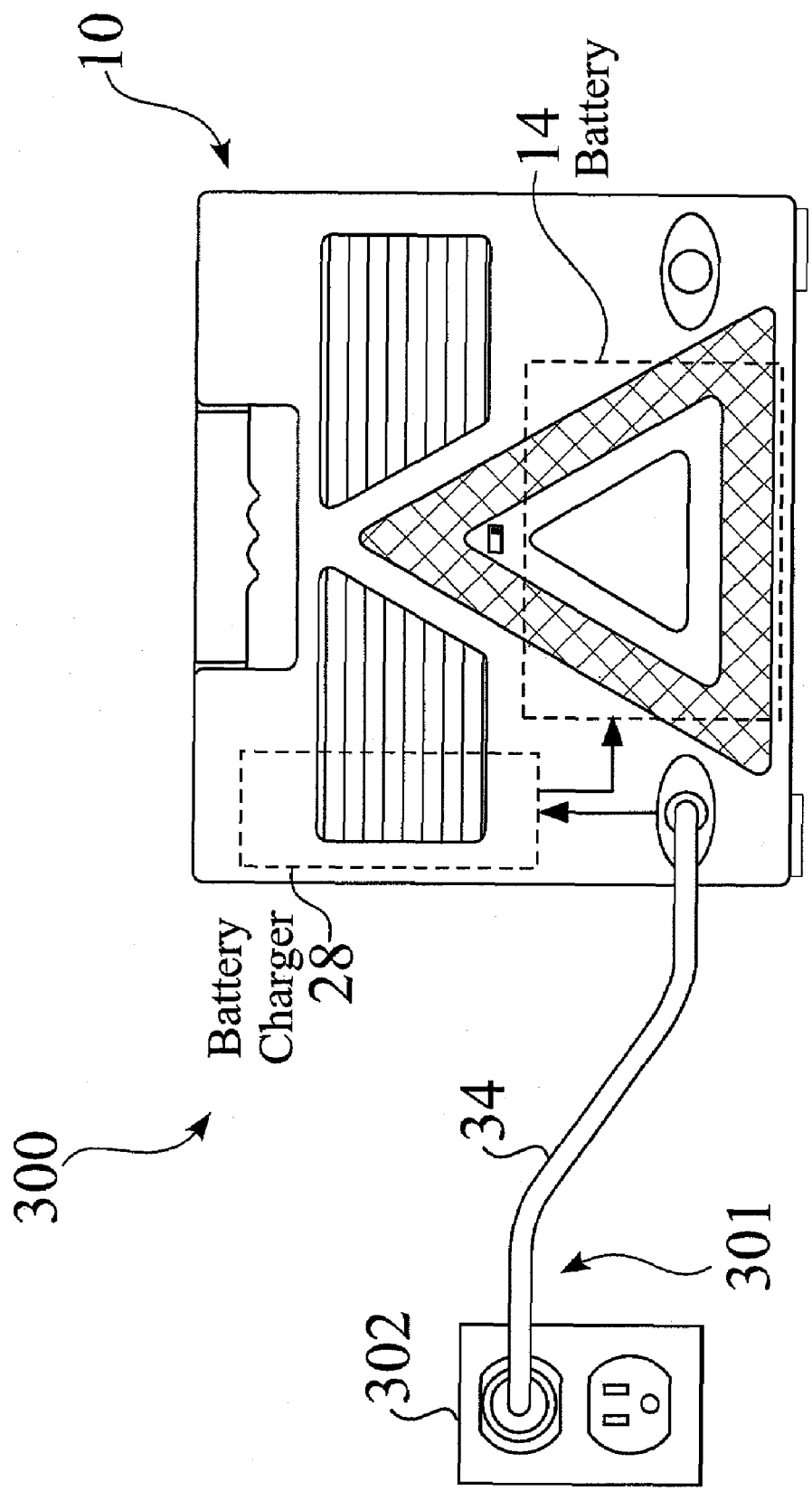
FIG. 24 shows connection of the portable emergency appliance to external power and recharging of the battery.

Recharging of Emergency Appliance. FIG. 24 shows the connection 301 recharge cord 34 of the portable emergency appliance 10 to external power 302 and recharging 300 of the battery 14. In the portable emergency appliance 10 shown in FIG. 24, the recharge cord 34 is retractably integrated into the appliance 10, wherein the cord 34 is stored out of the way when not needed, such as during storage and use, and is easily accessible for recharging 300 the appliance 10. While the portable emergency appliance 10 may typically be recharged independently from the vehicle 202, some vehicles 202, e.g. such as an FJ Cruiser™ by Toyota Motor Car Company, of Japan, include an AC outlet, through which the portable emergency appliance 10 can be recharged.

Although the emergency appliance system and methods of use are described herein in connection with jumper cables for a vehicular environment, the structures and techniques can be implemented for a wide variety of applications and environments, or any combination thereof, as desired.

For example, an alternate emergency appliance can be provided for therapeutic or emergency medical environments. For instance, a medical appliance can provide one or more retractable voltage or current carrying elements or paddles linked to an extendable handle.

As well, while the emergency appliance system and methods of use are described herein in connection with an extendable handle that can be used to move the appliance, the retractable or telescoping member is not necessarily limited to a handle for the device, but to an extendable structure that aids both storage and access of any of cables, cords, hoses, tubes and conduits.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

What is claimed is:

1. An apparatus, comprising:
    a housing;
    a telescoping handle that is movable between a first retracted position and a second extended position in relation to the housing;
    a battery located within the housing, the battery having a first terminal and a second terminal;
    a first retractably extendable electrically conductive battery cable having a first end electrically connected to the first terminal and a second end removably attachable to the telescoping handle; and
    a second retractably extendable electrically conductive battery cable having a first end electrically connected to the second terminal and a second end removably attachable to the telescoping handle;
    wherein when the second ends of the battery cables are attached to the telescoping handle and the telescoping handle is moved from the first retracted position to the second extended position, the second ends of the battery cables extend from the housing.

2. The apparatus of claim 1, further comprising electrically conductive battery clamps on the second ends of the first battery cable and the second battery cable.

3. The apparatus of claim 1, wherein the first battery cable and the second battery cable are electrically insulated from each other when attached to the telescoping handle.

4. The apparatus of claim 1, wherein the telescoping handle comprises a first side and a second side, and an electrically insulative region between the first side and the second side, wherein the second end of the first battery cable is removably attachable from the first side of the telescoping handle, and wherein the second end of the second battery cable is removably attachable from the second side of the telescoping handle.

5. The apparatus of claim 4, wherein the battery cables further comprise respective electrically insulative layers, wherein the color of the electrically insulative layer of the first battery cable is different from the color of the electrically insulative layer of the second battery cable.

6. The apparatus of claim 5, wherein the color of the electrically insulative layer of the first battery cable matchably corresponds to the color of at least a portion of the first side of the telescoping handle, and wherein the color of the electrically insulative layer of the second battery cable matchably corresponds to the color of at least a portion of the second side of the telescoping handle.

7. The apparatus of claim 1, wherein the battery cables further comprise respective electrically insulative layers, wherein the color of the electrically insulative layer of the first battery cable is different from the color of the electrically insulative layer of the second battery cable.

8. The apparatus of claim 1, further comprising:
    a battery charger module within the housing comprising means for receiving external alternating current power, means for transforming alternating current power to direct current power, and electrically connected to the first terminal and the second terminal of the battery.

9. The apparatus of claim 8, wherein the means for receiving external alternating current power is any of extendable and retractable in relation to the housing.

10. The apparatus of claim 1, further comprising:
    at least one power outlet electrically connected to the first terminal and the second terminal of the battery.

11. The apparatus of claim 1, further comprising:
    an electrical inverter circuit electrically connected to the first terminal and the second terminal of the battery and having an output; and
    at least electrical port connected to the output of the inverter.

12. The apparatus of claim 1, further comprising:
    a pump electrically connected to the battery and having an air port; and
    a conduit having a hollow passage defined therethrough connected to the air port of the pump.

13. The apparatus of claim 12, wherein at least a portion of the conduit is a flexible.

14. The apparatus of claim 12, wherein at least a portion of the conduit is any of extendable and retractable in relation to the housing.

15. The apparatus of claim 1, further comprising:
    means for any of lighting and reflection.

16. The apparatus of claim 15, wherein the lighting means are light emitting diodes (LEDs).

17. The apparatus of claim 15, wherein the lighting means are switchably activatible.

18. The apparatus of claim 15, wherein the lighting means are any of extendable, flexible and rotatable.

19. The apparatus of claim 1, further comprising:
    at least one wheel attached to the housing.

20. The apparatus of claim 1, further comprising:
    means for storing at least one tool.

21. A process, comprising the steps of:
    providing a structure comprising
    a housing,
    a telescoping handle having a retracted position and an extended position in relation to the housing,
    a battery located within the housing, the battery having a first terminal and a second terminal,
    a first retractably extendable electrically conductive battery cable having a first end electrically connected to the first terminal and a second end removably attachable to the telescoping handle, and
    a second retractably extendable electrically conductive battery cable having a first end electrically connected to the second terminal and a second end removably attachable to the telescoping handle;
    moving the telescoping handle from the retracted position to the extended position when the second ends of the battery cables are attached to the telescoping handle, such that the second ends of the battery cables extend from the housing;
    disconnecting the second ends of the battery cables from the handle;

electrically connecting the second ends of the battery cables to an external entity; and providing power to the external entity.

22. The process of claim 21, further comprising the steps of:

electrically disconnecting the second ends of the battery cables from the external entity;

connecting the second ends of the battery cables to the handle; and moving the telescoping handle from the extended position to the retracted position, wherein the second ends of the battery cables are retracted toward the housing.

23. The process of claim 21, wherein the external entity is a vehicle.

24. The process of claim 23, further comprising the step of:

jump starting the vehicle with the provided power.

25. The process of claim 21, wherein the structure further comprises a pump electrically connected to the battery and having an air port, and a conduit having a hollow passage defined therethrough connected to the air port of the pump.

26. The process of claim 25, further comprising the steps of:

connecting the conduit to the external entity; and providing air from the pump to the external entity.

27. The process of claim 21, wherein the structure further comprises a battery charger module within the housing comprising means for receiving external alternating current power, means for transforming alternating current power to direct current power, and means for providing DC power between the first terminal and the second terminal of the battery.

28. The apparatus of claim 1, wherein when the second ends of the battery cables are attached to the telescoping handle and the telescoping handle is moved from the second extended position to the first retracted position, the second ends of the battery cables are retracted toward the housing.

* * * * *